(12) United States Patent
Mizutani et al.

(10) Patent No.: US 8,045,759 B2
(45) Date of Patent: Oct. 25, 2011

(54) OBJECT DETECTION SYSTEM AND METHOD

(75) Inventors: Masami Mizutani, Kawasaki (JP);
Takafumi Edanami, Yokohama (JP);
Ikumi Edanami, legal representative, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 707 days.

(21) Appl. No.: 12/230,116

(22) Filed: Aug. 22, 2008

(65) Prior Publication Data

US 2009/0066490 A1    Mar. 12, 2009

(30) Foreign Application Priority Data

Nov. 29, 2006    (WO) .................. PCT/JP2006/323792

(51) Int. Cl.
*G06K 9/00* (2006.01)
(52) U.S. Cl. ........................................ 382/103
(58) Field of Classification Search .................. 382/103; 348/169; 340/435, 937
See application file for complete search history.

(56) References Cited

U.S. PATENT DOCUMENTS

| | | | | |
|---|---|---|---|---|
| 5,937,079 A * | 8/1999 | Franke | ........................... | 382/103 |
| 6,570,998 B1 | 5/2003 | Ohtsuka et al. | | |
| 7,046,822 B1 * | 5/2006 | Knoeppel et al. | ............. | 382/103 |
| 7,620,208 B2 * | 11/2009 | Zhu et al. | ....................... | 382/104 |
| 2002/0134151 A1 * | 9/2002 | Naruoka et al. | ................ | 73/291 |
| 2003/0076414 A1 * | 4/2003 | Sato et al. | ..................... | 348/148 |
| 2003/0138133 A1 | 7/2003 | Nagaoka et al. | | |
| 2004/0178945 A1 * | 9/2004 | Buchanan | ....................... | 342/70 |

FOREIGN PATENT DOCUMENTS

| | | |
|---|---|---|
| JP | 8-315149 | 11/1996 |
| JP | 2000-39306 | 2/2000 |
| JP | 2003-230134 | 8/2003 |
| JP | 2003-284057 | 10/2003 |
| JP | 2005-339389 | 12/2005 |
| JP | 2006-099603 | 4/2006 |

OTHER PUBLICATIONS

M. Bertozzi et al., "Vision-based Pedestrian Detection: will Ants Help?", IEEE Intelligent Vehicles 2002, vol. 1, 7 pages.
M. Bertozzi, et al., "Pedestrian Localization and Tracking System with Kalman Filtering", 2004 IEEE Intelligent Vehicles Symposium, Jun. 14-17, 2004, pp. 584-589.
International Search Report for PCT/JP2007/000616, mailed Aug. 28, 2007.

* cited by examiner

*Primary Examiner* — Jason M Repko
*Assistant Examiner* — Shervin Nakhjavan
(74) *Attorney, Agent, or Firm* — Staas & Halsey LLP

(57) ABSTRACT

An object detection system, comprising an unit for calculating relationship information between a position on an image of an object existing on a road surface and a size of an image picked up by one camera, using an actual size of a target object and camera parameter, a unit for evaluating an existence possibility of a symmetry axis in a specific pixel incase of an interval determined on the basis of geometric information, a unit for evaluating density and continuity in the vicinity of the center axis of a rectangular area of a pixel whose symmetry value is equal to or more than a specific threshold and detecting the lowest end point of the symmetric object and a unit for outputting a position and size of a candidate area of the symmetric object on the basis of the lowest end point.

15 Claims, 22 Drawing Sheets

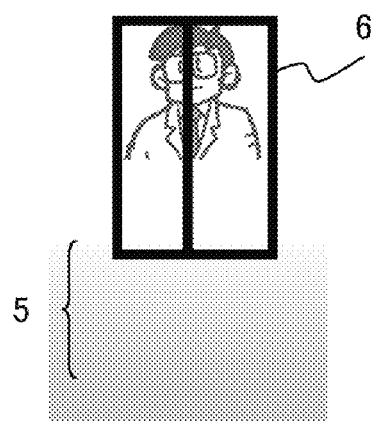
F I G. 2 A
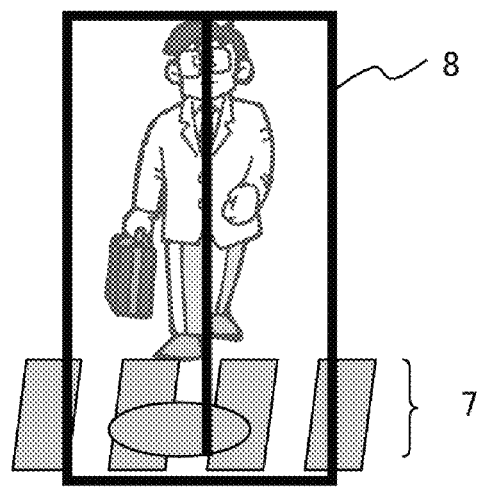
F I G. 2 B

| y COORDINATE (pixel) | RECTANGLE WIDTH OF OBJECT W(pixel) | RECTANGLE HEIGHT OF OBJECT H(pixel) | INTERVAL SIZE T |
|---|---|---|---|
| 1 | | | |
| 2 | | | |
| ... | | | |
| 140 | 10 | 20 | 17 |
| 141 | 11 | 22 | 17 |
| 142 | 12 | 24 | 17 |
| ... | | | |
| 180 | 25 | 50 | 30 |
| 181 | 26 | 52 | 30 |
| ... | | | |

F I G. 5

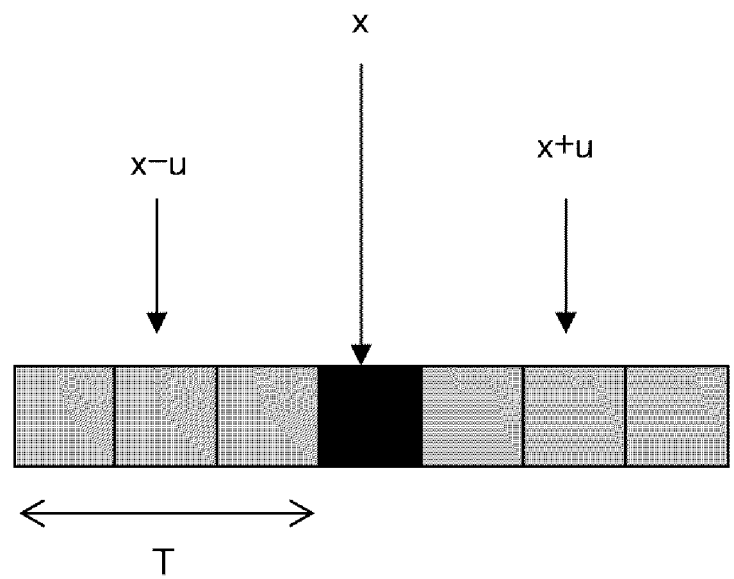
F I G. 7

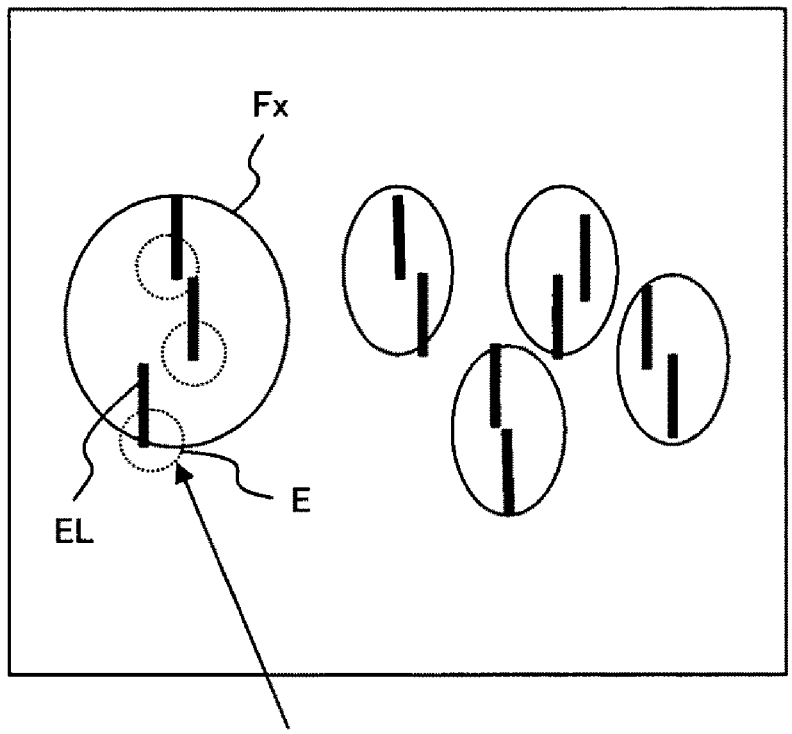
THE LOWEST END POINT E OF A LINE SEGMENT OBTAINED BY THE THINNING PROCESS
F I G. 8

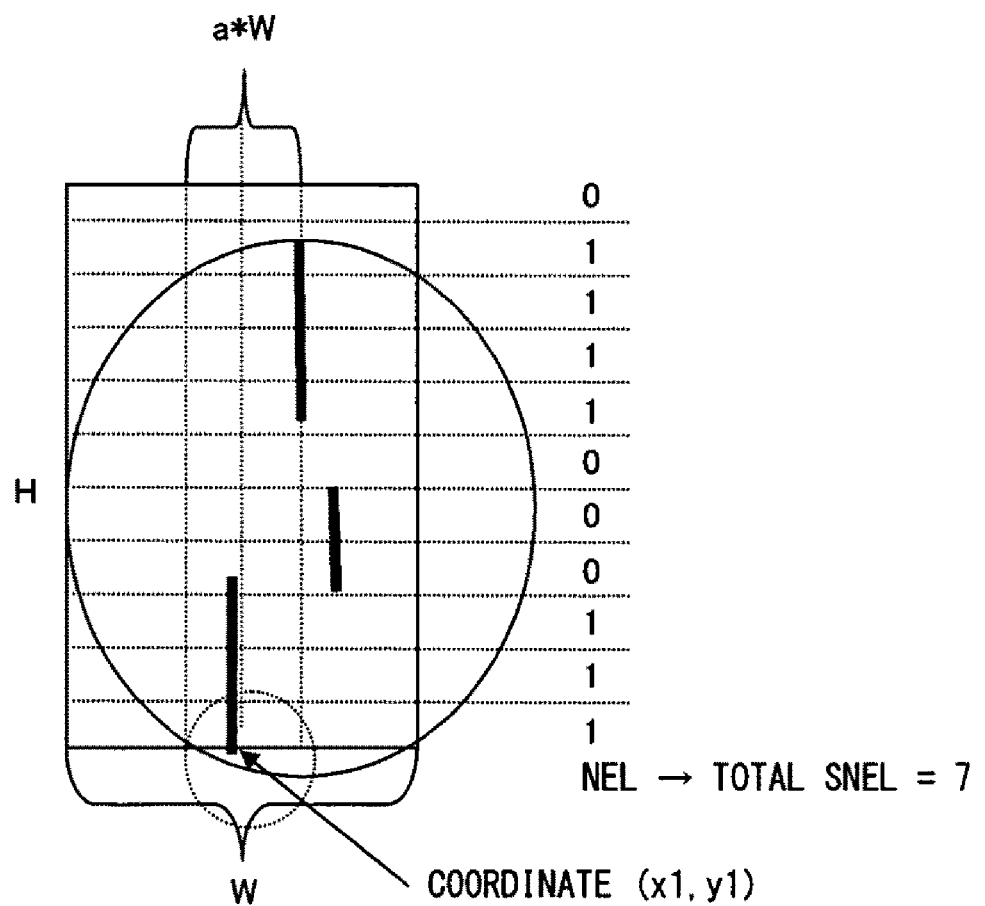
F I G. 9

| y COORDINATE (pixel) | RECTANGLE WIDTH OF OBJECT W(pixel) | RECTANGLE HEIGHT OF OBJECT H(pixel) | INTERVAL SIZE T |
|---|---|---|---|
| 1 | | | |
| 2 | | | |
| ... | | | |
| 140 | 10 | 20 | 11 |
| 141 | 11 | 22 | 13 |
| 142 | 12 | 24 | 13 |
| ... | | | |
| 180 | 25 | 50 | 27 |
| 181 | 26 | 52 | 27 |
| ... | | | |

FIG. 14

| BODY PART ID | VERTICAL DIVISION RATIO | INTERVAL SIZE (RATIO TO W) | SYMMETRY AXIS EXISTING POSITION (EXPECTED VALUE) | REMARKS |
|---|---|---|---|---|
| 1 | 1 | 0.5 | 0.5 | HEAD |
| 2 | 2 | 1 | 0.5 | UPPER BODY |
| 3 | 2 | 0.3 | 0.3, 0.7 | LOWER BODY |

F I G. 1 9

OBJECT DETECTION SYSTEM AND METHOD

CROSS REFERENCE TO RELATED APPLICATION

This application is a continuation application, under 35 U.S.C. §111(a), of international PCT application No. PCT/JP2007/000616 filed on Jun. 8, 2007, which claims priority to international application No. PCT/JP2006/323792, filed Nov. 29, 2006, the disclosures of which are incorporated herein by reference.

BACKGROUND OF THE INVENTION

1. Field of the Invention

The present invention relates an object detection device mounted on a vehicle and the like and its method, and more particularly to an object detection device for detecting the image area having a high possibility of including an object, such as a pedestrian and the like of an image picked up by a single-lens camera mounted on a vehicle and the like and its method.

2. Description of the Related Art

As to the present vehicle-mounted preparatory prevention system of forward-collision accidents, various methods are proposed.

For example, Patent Document 1 proposes a system for detecting the size and position of a vehicle by detecting light in an image picked up by two infrared cameras.

As a system for targeting and detecting an object, such as a pedestrian and the like, Non-patent Document 1 proposes one method.

The traditional object detection method of a pedestrian and the like disclosed by Non-patent Document 1 uses the fact that the shape of a pedestrian is almost axially symmetric and extracts the candidate area of the pedestrian by evaluating the axial symmetry in an image local area.

The object detection method disclosed by Non-patent Document 1 evaluates the symmetry of a brightness image and an edge image in a rectangle area of each pixel, supposed to enclose a person when assuming that the pixel represents its feet, on the basis of the object size and the perspective projection conditions (its detailed method is not disclosed). In this case, when there is a plurality of rectangle areas whose symmetry evaluation value is equal to or more than a threshold on the symmetry axis, one in which the symmetry of a vertical edge image and an evaluation function (undisclosed) whose component is a vertical edge density are maximums is selected.

However, assuming that there is the same vertical symmetry axis from the top until the bottom of a rectangular area supposed to enclose a person, sometimes a problem occurs.

For example, in the case of a person that walks sideways in a large foot step, sometimes the symmetry of a lower-body cannot be obtained in the same symmetry axis as the upper-body. In this case, a small area is selected in the further upper section than essential.

This causes a problem that when converting a distance from its own vehicle, it is detected farther away than actual since the rectangular area decreases. In a small rectangular area, there is a possibility that a rectangular area for only the upper-body is discarded by the detailed determination of pattern recognition in the later stage, which deteriorates the detection function.

FIG. 1 shows the above-described problem.

FIG. 1 typically expresses an image in which a person is walking.

When a person is walking, it is difficult to obtain a symmetry axis passing through from the upper-body until the lower-body. In FIG. 1, a symmetry axis 2 against which the lower-body is horizontally symmetric deviates from the symmetry axis 1 of the upper-body. In the system of Non-patent Document 1, although the image of this one person must be essentially detected like a rectangular area 4, only the rectangular area 3 of the upper-body is detected and the lower-body is processed as another rectangular area.

However, in Non-patent Document 2, two cameras are mounted on a vehicle and the distance of a rectangular area is obtained by measuring the distance by a stereo image processing method. Then, the correction of a rectangular area is applied to a position and a size led by the perspective projection conditions, on the basis of the obtained distance. However, in this method of Non-patent Document 2, since a mechanism for a stereo image process is necessary, for example, since two cameras are necessary, costs become high.

When its contrast with the background is insufficient and the image 5 of the lower-body is not clear, a smaller area 6 is selected in the further upper section than essential since the vertical edge is not sufficiently extracted as shown in FIG. 2A.

When there is a symmetry texture 7 (painting, manhole, etc.) at its feet, a large rectangular area 8 is selected in the further lower section than essential as the rectangular area for the pedestrian, as shown in FIG. 2B since the vertical edge is taken into consideration.

In view of the above, it is an object of the present invention to provide an object detection system and method having a mechanism for determining the area of a target object with higher accuracy using only an image picked up by a single-lens camera without performing a stereo image process.

It is another object of the present invention to provide an object detection system and method with a higher object detection function at low costs.

Patent Document 1: Japanese Patent Application No. 2003-230134

Non-patent Document 1: Massimo Bertozzi, Alberto Broggi et al., "Vision-based Pedestrian Detection: Will Ants Help?", IEEE Intelligent Vehicles 2002, volume 1, pages 1-7 (June 2002).

Non-patent Document 2: Alberto Broggi, Massimo Bertozzi at el., "Pedestrian Localization and Tracking System with Kalman Filtering", IEEE Intelligent Vehicles 2004, pages 584-589 (June 2004).

SUMMARY OF THE INVENTION

In order to solve the above-described problems, an object detection system according to the present invention comprises a geometric information generation unit, a symmetry evaluation unit, a symmetry-axis continuity evaluation unit and a rectangular area generation unit.

The geometric information generation unit calculates the relationship information between the position on the image of an object existing on a road surface and the image area size of the image picked up by one camera, in case of the actual size of a target object and camera parameter information.

The symmetry evaluation unit evaluates the existence possibility of a symmetry axis in a specific pixel using an interval size T determined on the basis of geometric information.

The symmetry-axis continuity evaluation unit evaluates the density and continuity in the vicinity of the center axis of a rectangular area of the pixel whose symmetry value evaluated by the symmetry evaluation unit is equal to or more than a specific threshold and detects the lowest end point of the symmetric object.

The rectangular area generation unit outputs the position and size of the candidate area of the symmetric object on the basis of the lowest end point specified by the symmetry-axis continuity evaluation unit and the geometric information.

According to this configuration, the symmetry axis of a rectangular area extracted from an image can be calculated and the continuity of this symmetry axis can be regarded as one rectangular area.

The present invention can further comprise a reflection area extraction unit connected to an irradiation light for alternately switching on/off in synchronization with the shutter of the camera, for calculating the differential image between an image picked up when the irradiation light is on and an image picked up when the irradiation light is off and extracting a reflection area by applying a line segment elimination filter. The geometric information generation unit calculates the relationship information between the position on an image of an object existing on a road surface and an image area size in the reflection area, using the actual size of a target object and camera parameter information.

According to this configuration, a reflection area for generating an image in which the texture in a road surface area is weakened and a light reaction area is emphasized can be extracted from the continuous image.

Furthermore, the present invention can also comprise a target-object body-part division information storage unit for storing body-part area information depending on the target object in the rectangular area, an area division processing unit for dividing a rectangular area into a plurality of partial areas on the basis of the body-part area information and an integrated determination unit for integratedly determining a candidate pedestrian area on the basis of a symmetry axis existing probability calculated in each of the partial areas by the symmetry-axis continuity evaluation unit. The symmetry evaluation unit evaluates the existence possibility of a symmetry axis in each of the divided partial areas using the interval size defined by the body-part area information and the symmetry-axis continuity evaluation unit evaluates density in a prescribed position in the partial area of the candidate symmetry axis area evaluated by the symmetry evaluation unit and calculates a symmetry axis existing probability.

According to this configuration, a system with a higher object detection function can be realized.

The prevent invention also includes its object detection method in its range.

BRIEF DESCRIPTION OF THE DRAWINGS

FIG. 2A shows a case where since a vertical edge is not sufficiently extracted, a small area is selected in the further upper section than essential.

FIG. 2B shows a case where there is a symmetry texture (painting, manhole, etc.) in its feet.

FIG. 5 shows a composition example of a geometric information table used in the first preferred embodiment.

FIG. 7 shows a function Symm (x, T).

FIG. 8 shows the reaction area Fx of a symmetry filter, whose symmetry evaluation value is equal to or more than a threshold, a line segment area EL and the lower end point E of a line segment area EL.

FIG. 9 shows the evaluation of the density and continuity of a thinning line-segment area EL, in the vicinity of the center axis of a rectangular area R.

FIG. 14 shows a composition example of a geometric information table used in the second preferred embodiment.

FIG. 19 shows an example of body part area information stored in the target-object body-part division information storage unit.

DESCRIPTION OF THE PREFERRED EMBODIMENT

One preferred embodiment of the present invention is described below with reference to the drawings.

In the system of this preferred embodiment, an image picked up by a single-lens camera mounted on a vehicle and the like and an image area including line symmetry is detected as an image area having a high possibility of including a detection target object taking into consideration a feature that the detection target object, such as a pedestrian and the like is almost line symmetric.

Figure 1:
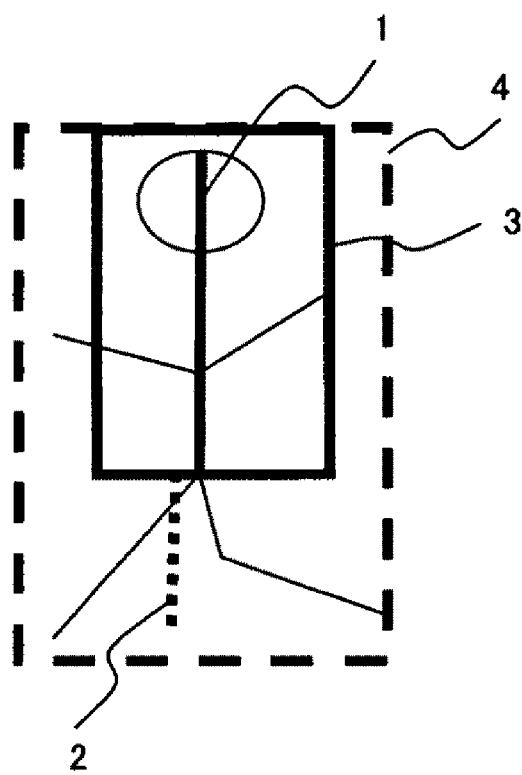
FIG. 1 shows problems in the traditional object detection.
Figure 3:
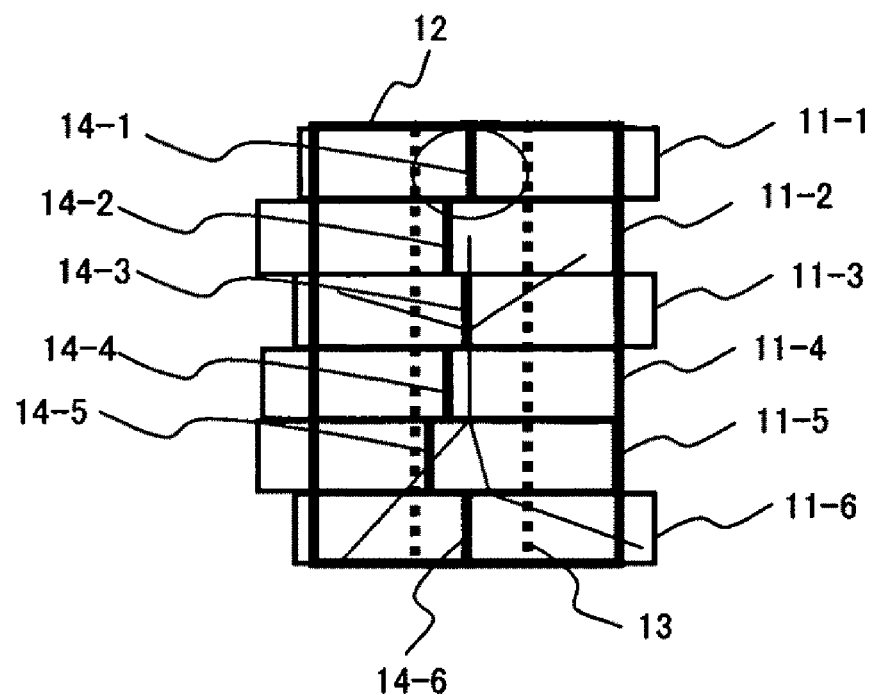
FIG. 3 shows the summary of this preferred embodiment.

Specifically, in FIG. 3, by evaluating the symmetry of thin rectangular areas 11-1~11-6 supposed to enclose the width of a person of an image picked up by the camera and evaluating the density and continuity of candidate symmetry axis areas 14-1~14-6 which exists in the vicinity of the center axis 13 of a rectangular area 12 supposed to enclose a person, the candidate area of a person is generated, which has a robust effect on a case where the symmetry axis partially deviates and a symmetry axis in the oblique direction.

The system in the second preferred embodiment further comprises an irradiation light which alternately lights/extinguishes horizontally in synchronization with the shutter of a camera and can provide a system with a further higher object detection function by extracting a reflection area for generating an image in which the texture in a road surface area is weakened and a light reaction area is emphasized can be extracted from the continuous image and applying the same process as in the first preferred embodiment to an image in this reflection area.

The system in the third preferred embodiment can provide a system with a further higher object detection function by further dividing the extraction frame of the extracted target into a plurality of areas and evaluating a symmetry axis for each area.

Figure 4:
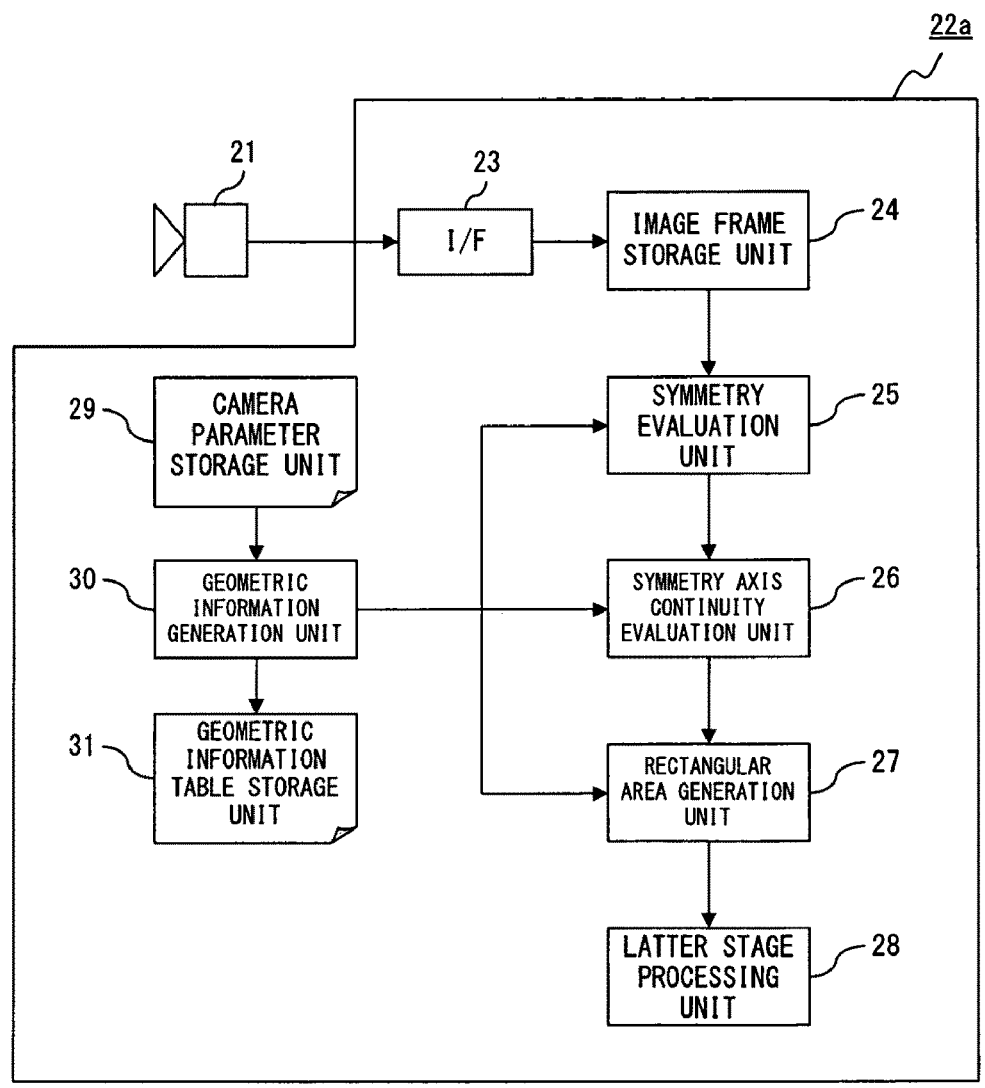
FIG. 4 shows the system configuration of the first preferred embodiment.

FIG. 4 shows the system configuration example of the first preferred embodiment.

In FIG. 4, an object detection system 22a is connected to a camera 21 and comprises a camera interface 23, an image frame storage unit 24, a symmetry evaluation unit 25, a symmetry-axis continuity evaluation unit 26, a rectangular area generation unit 27, a latter stage processing unit 28, a camera parameter storage unit 29, a geometric information generation unit 30 and a geometric information table storage unit 31.

The camera interface 23 connects the camera 21 and the object detection system 22a. The image frame storage unit 24 is a memory which stores the data of one image frame picked up by the camera 21. The symmetry evaluation unit 25 evaluates the possibility of a symmetry axis in the horizontal direction, in a specific pixel by a symmetry interval (interval size) determined on the basis of geometric information stored in the geometric information table storage unit 31. The symmetry-axis continuity evaluation unit 26 evaluates the density and continuity in the vicinity of the center axis in a rectangular area, of a pixel whose symmetry value evaluated by the symmetry evaluation unit 25 is equal to or more than a specific threshold and detects its lowest end point (feet). The rectangular area generation unit 27 outputs the position and size of a candidate area, such as a pedestrian and the like, on the basis of the lowest end point specified by the symmetry-axis continuity evaluation unit 26 and the geometric information.

The latter stage processing unit 28 applies an identification process by a neutral network and/or a pattern matching process to the candidate area, such as a pedestrian and the like, outputted by the rectangular area generation unit 27 to determine whether it is a rectangular area for a pedestrian and the like. The camera parameter storage unit 29 stores the parameters of the camera 21 connected to the object detection system 22a, such as the focus distance f of the camera 21, the position O' (x0, y0, z0) of the camera 21 against the center O of the motion of its own vehicle, the direction θ(yaw, row, pit) of the camera 21. The geometric information generation unit 30 calculates an image area supposed to enclose an object when it is supposed that a pixel represents its feet, of each pixel, from the object size and the perspective projection conditions of the camera. The geometric information table storage unit 31 stores a geometric information table in which information about the height and width of a rectangular area to enclose a person are related to each other when the y coordinate of each pixel represents the feet of the pedestrian, of a picked-up image.

Next, the detailed detection of a pedestrian by the system shown in FIG. 4 is described.

The geometric information generation unit 30 calculates an image area for an image picked up by a camera 21, supposed to enclose an object when it is supposed that the pixel represents it feet, of each pixel in the rectangular area, from the size of the object (pedestrian) and the perspective projection conditions. Specifically, for example, actual coordinates P (X, Y, Z) and coordinates Q (u, v) on the screen are related by a publicly known conversion expression using the focus distance f of the camera 21, the position O' (x0, y0, z0) of the camera 21 against the center O of the motion of its own vehicle, the direction θ(yaw, row, pit) of the camera 21 stored in the camera parameter storage unit 29.

Alternatively, by specifying the width of an actual person to be, for example, 70 cm or the like, the relationship between the y coordinate of a point on an image and the size of the height and width of a rectangle to enclose a person in the case where it is supposed that the point represents its feet is in advance generated as geometric information table and is stored in the geometric information table storage unit 31.

FIG. 5 shows a composition example of the geometric information table.

In the geometric information table shown in FIG. 5, the y coordinate of each pixel in an image picked up by the camera, the width W and the height H of a rectangular area including an object (pedestrian) of the rectangular area and an interval size T are related to each other and stored in a coordinate system in which the height and width directions of an image picked up by the camera 21 are taken in the x and y axes and the upper left corner is used as the origin, as geometric information. For example, when the Y coordinate of a pixel at its feet is 140, the width W and height H of a rectangular area including an object (pedestrian) and a interval size are 10, 20 and 17.5, respectively. The interval size is a value used when evaluating the symmetry of the rectangle, which is described in detail later.

The geometric information generation unit 30 relates actual coordinates P (X, Y, Z) and Coordinates Q on an image picked up by the camera 21 using a geometric information table stored in the geometric information table storage unit 31 and camera parameters stored in the camera parameter storage unit 29.

In such a state, an rectangular area including a pedestrian on an image picked up by the camera 21 is specified in the following procedures.

The detailed process performed by the system 22a in the first preferred embodiment is sequentially described below.
[Step 1]
The symmetry evaluation unit 25 determines the interval size T of the rectangular area width W corresponding to each y coordinate, using the geometric information table stored in the geometric information table.

As to the interval size T stored in the geometric information table, for example, (N+1) kinds of interval sizes T can be dispersedly determined using a value obtained by uniformly dividing the minimum value $W_{min}$ and maximum value $W_{max}$ of a rectangular area width W by N.

In this case, an interval size T can be calculated as follows.

$$S=(W_{max}-W_{min})/N$$

$$T_i=S(i-0.5)+W_{min}$$ [Mathematical expression 1]

Figure 6:
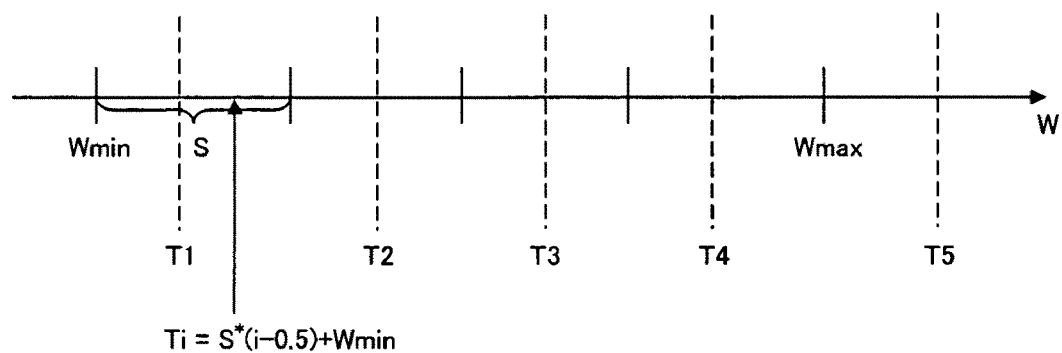
FIG. 6 shows an interval size T.

When this T is expressed graphically, FIG. 6 is obtained (N=5 in FIG. 6).

For example, when $W_{min}=10$, $W_{max}=110$ and N=8, nine kinds of interval sizes T=17.5, 30, 42.5, 55, 67.5, 80, 92.5, 105 and 117 are determined.

In this case, as to a specific y coordinate, an interval size Ti is defined using the minimum "i" in which W<Ti.

For example, in the geometric information table shown in FIG. 5, when y coordinate=141, W=11. Therefore, an interval size T=17.5 is determined using the minimum i=1 which satisfies W<Ti.
[Step 2]
Then, the symmetry evaluation unit 25 generates a filter reactive image Fi in which the symmetry in the horizontal direction in each pixel x of an image I is evaluated by the function Symm (x,T) of a symmetry filter, in each interval size Ti.

Symm (X, T) is calculated using the maximum odd number not exceeding Ti for the determined interval size Ti. For example, when T=17.5, T=17 is used.

The symmetry in the interval size T of a signal in the horizontal direction, of each pixel can be evaluated by the following function Symm of a symmetry filter.

[Mathematical expression 2]

$$Symm(x, T) = \frac{\sum_{u=1}^{T} E'(u, x)^2 - \sum_{u=1}^{T} O(u, x)^2}{\sum_{u=1}^{T} E'(u, x)^2 + \sum_{u=1}^{T} O(u, x)^2}$$

Even function component E(u,x)=0.5*(I(x−u)+I(x+u)) □Normalized E'=E−$E_{AV}$

Odd function component O(u,x)=0.5*(I(x−u)+I(x+u))

In the above equation, E and O are the even and odd function components, respectively, of an image I using x as the center. In this case, E is normalized by subtracting the average $E_{AV}$ of E at u=1~T from E to calculate E'. Then, it can be made the evaluation function of symmetry by evaluating it by a difference in squared sum between the odd function component O and the normalized value E'.

When this function Symm(x, T) is expressed graphically, FIG. 7 is obtained.

Although in the above equation, only one line in the horizontal direction of an image I is evaluated, this preferred embodiment is not limited to this. A plurality of lines can be also assigned in the horizontal direction and evaluated.

When a plurality of lines of pixels is evaluated, the evaluation function Symm becomes as follows.

[Mathematical expression 3]

$$Symm(x, T) = \frac{\sum_{y} \sum_{u=1}^{T} E'(u, x, y)^2 - \sum_{y} \sum_{u=1}^{T} O(u, x, y)^2}{\sum_{y} \sum_{u=1}^{T} E'(u, x, y)^2 + \sum_{y} \sum_{u=1}^{T} O(u, x, y)^2}$$

Even function component E(u,x, y)=0.5*(I(x−u,y)+I(x+u,y))□Normalized E'=E−$E_{AV}$ Odd function component O(u,x,y)=0.5*(I(x−u,y)+I(x+u,y))

[Step 3]

The symmetry axis continuity evaluation unit 26 applies a smoothing process to each image Fi using weight in the height direction to generate an image Fi'. The image Fi' can be obtained according to an evaluation expression Vsymm(x).

Vsymm(x)=Symm(x,T)□ones(m,n)    [Mathematical expression 4]

Ones(m,n): Matrix m×n in which all elements are 1
 Example m=7, n=3
 □□Convolution operation

[Step 4]

The symmetry axis continuity evaluation unit 26 applies a thinning process to only the height direction of an area Fx whose symmetry evaluation value is equal to or more than a specific threshold Th1 and extracts a line segment area EL obtained by the thinning process.

When a value Fi'(x) in the pixel x of an image Fi' becomes the maximum of the peripheral pixel Fi'(x−t), . . . , Fi'(x), . . . , Fi'(x+t) at a distance "t" in both left/right directions, the thinning process outputs 1. Otherwise, it outputs 0.

The thinning process Thin is expressed as follows.
 Thin(x,t)=1 if Fi'(x)=max(Fi'(x−t), . . . , Fi'(x), . . . , Fi'(x+t))
 otherwise 0

The reaction area Fx of symmetry filter whose symmetry evaluation value is equal to or more than a threshold Th1, a line segment area FL and the lower end point E of a line segment area EL are shown in FIG. 8.

[Step 5]

The symmetry axis continuity evaluation unit 26 extracts the lower end point E of the line segment area EL to which a thinning process is applied. The lower endpoint E can be obtained by evaluating the continuity in the y axis direction of the line segment area EL obtained by the thinning process.

[Step 6]

The symmetry axis continuity evaluation unit 26 determines a rectangular area R existing in the upper section, on the basis of the geometric information table storage unit 31.

Specifically, for example, it is assumed that an area X=−W/2+x~x+W/2, Y=y−H+1~y is a rectangular area R. However, when rectangle width W is larger or smaller than a prescribed value for an interval size T, this rectangular area R is discarded. For example, only when 0.5*T<W<1.5T, it is adopted as a rectangular area R.

[Step 7]

The symmetry axis continuity evaluation unit 26 evaluates the density and continuity of the thinning line segment area EL in the vicinity of the center axis of the rectangular area R determined in Step 6.

Its detailed process is described below with reference to FIG. 9.

Firstly, when the center coordinates of a rectangular area with width W and height H is (x1, y1), the existence $N_{EL}$ of a thinning line segment area EL in each line of a center area (x1−0.5*a*W~x1+0.5*a*W, y=y1−H~y1) of a % is evaluated. In this preferred embodiment, the amount of thinning line segment areas EL existing in an area a % from this center area is called density.

In FIG. 9, a part in which the line segment area EL is included in the center area a*W of a % and a part in which the line segment area EL is excluded from the center area a*W of a % are expressed 1 and 0, respectively.

Then, if the total $SN_{EL}$ (7 in FIG. 9) of $N_{EL}$ for all lines of the center area of a % is equal to or more than a predetermined threshold Th2, it is determined that there is a symmetry axis in the rectangular area R.
(For example, $SN_{EL}$>H*Th2)

[Step 8]

The rectangular are generation unit 27 integrates rectangular areas R obtained in each target filter reactive image Fi (i=1, . . . , N+1) and integrates closely located ones. For example, if a distance between bottom center points E1 and E2 of each of two rectangular areas R1 and R2 is equal to or less than a specific threshold Th3, a rectangular area whose density (N2/H) in the vicinity of the center axis of the symmetry axis is the larger is selected and the other is discarded.

The rectangular area R obtained thus is considered to be a candidate pedestrian rectangular area.

Then, the latter stage processing unit 28 applies an identification process by a neutral network and/or a pattern matching process to this candidate pedestrian rectangular area and it is determined whether it is a true pedestrian rectangular area.

When performing the processes of the symmetry evaluation unit 25 and the symmetry axis continuity evaluation unit 26 using an interval size T, a multi-resolution process, such as Gaussian Pyramid or the like can also reduce the size of an image into ½, ¼ or the like in order to reduce the amount of calculation. In this case, for example, when reducing it to ½, a ½-sized image is evaluated using an interval size ½T. Then, when integrating rectangular areas, it is restored to the original size.

Figure 10:
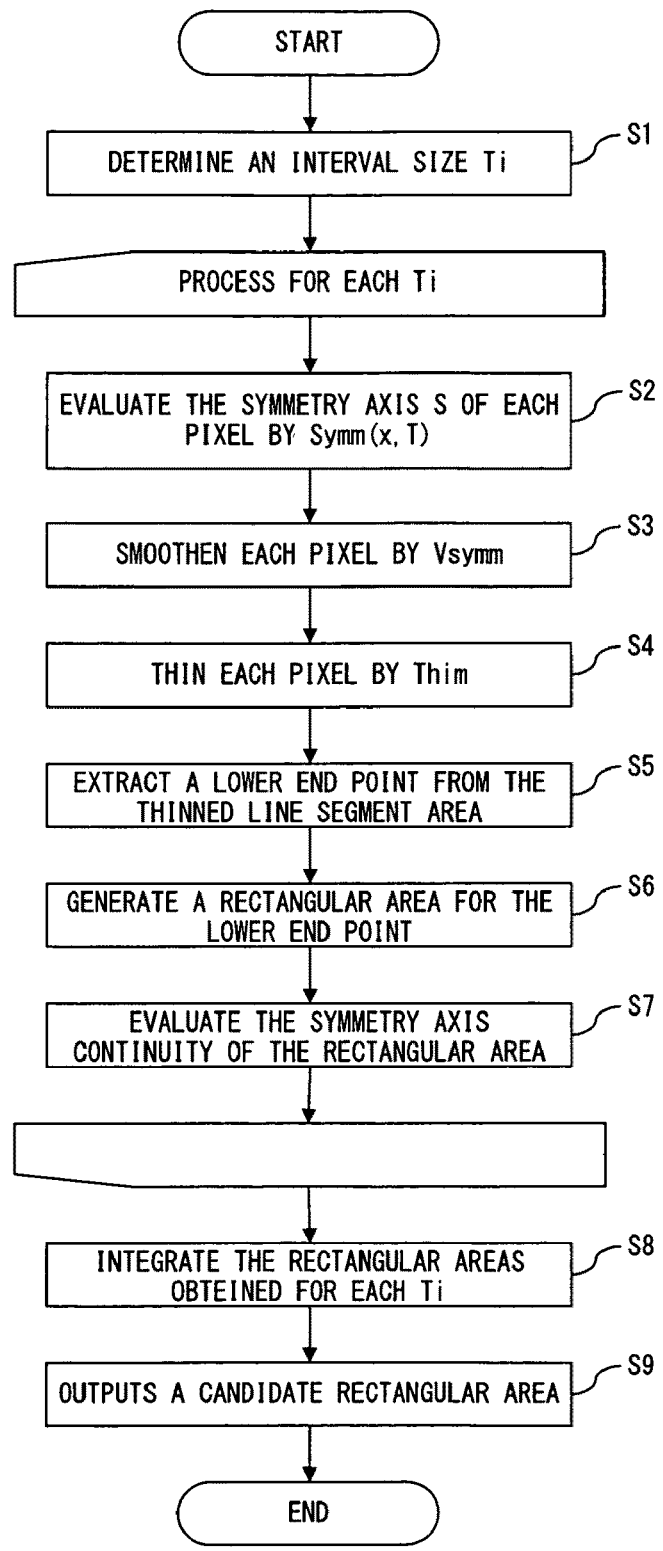
FIG. 10 is a flowchart showing the process of the system in the first preferred embodiment.

FIG. 10 is a flowchart showing a process performed by the system in the first preferred embodiment.

In FIG. 10, firstly, as a pre-treatment, the geometric information table 31 is calculated for each frame.

Then, in step S1, an interval size Ti is determined referring to the geometric information table 31.

Then, in step S2, the symmetry axis evaluation process using the above-described function Symm(x, T) is applied to each pixel as to each interval size Ti.

Then, in step S3, a smoothing process by the above-described function Vsymm is applied to each pixel of the image obtained in step S2.

Then, in step S4, a line segment area EL is extracted by a thinning process Thin.

Then, in step S5, the lower endpoint E of the line segment area EL obtained in step S4.

Then, in step S6, a rectangular area R is generated assuming that this lower end point is pedestrian's feet.

Then, in step S7, it is checked whether the line segment area EL is included in the area a % from the center, of the rectangular area R generated in step S6 and the continuity of the symmetry axis is evaluated.

The processes in steps s2 through S7 are performed as to each interval size Ti and in step S8, closely located ones of the rectangular areas R obtained in each interval size Ti are integrated. Then, lastly, in step S9, a candidate rectangular area is outputted.

As described above, in the first preferred embodiment, if it is in a specific range from the center even when the symmetry axes differ as in the upper body and lower body of a pedestrian, it can be considered to be one rectangular area.

Thus, an inexpensive high-performance pedestrian detection system capable of determining the area of a target object with high accuracy can be realized.

Next, the second preferred embodiment of the present invention is described.

FIG. 11 shows the configuration example of a system 40 in the second preferred embodiment.

Figure 11A:
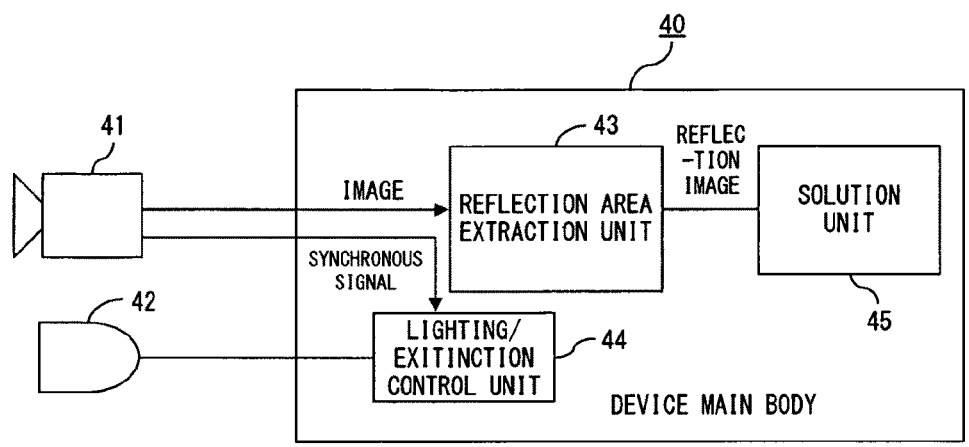
FIG. 11A shows the system configuration of the second preferred embodiment.

As shown in FIG. 11A, in the second preferred embodiment, an irradiation light 42 for applying near-infrared light and the like and a camera 41 capable of receiving light radiated from this irradiation light 42 are connected to the system 40. The system 40 comprises a reflection area extraction unit 43, a lighting/extinction control unit 44 and a solution unit 45.

Although in the following description, as the irradiation light 42 and the camera 41, a near-infrared one which radiates near-infrared light and a near-infrared one capable of receiving near-infrared light, respectively, are used, the camera 41 and light 42 of this preferred embodiment are not limited to those. Any other light capable of radiating light actively like radar and the like and any other camera capable of receiving the reflection light of this irradiation can be also used.

The reflection area extraction unit 43 extracts the reflection area of irradiation light. The lighting/extinction control unit 44 controls to alternately switch the on/off of the irradiation light 42 in synchronization with the shutter of the camera 41. The solution unit 44 applies the same processes as those of the symmetry axis evaluation unit 25, the symmetry axis continuity evaluation unit 26 and the rectangular area generation unit 27 in the first preferred embodiment to the image in the reflection area extracted by the reflection area extraction unit 43.

The irradiation light 42 is switched on/off in synchronization with the shutter of the camera 41, and radiates almost in parallel with the road surface.

Figure 11B:
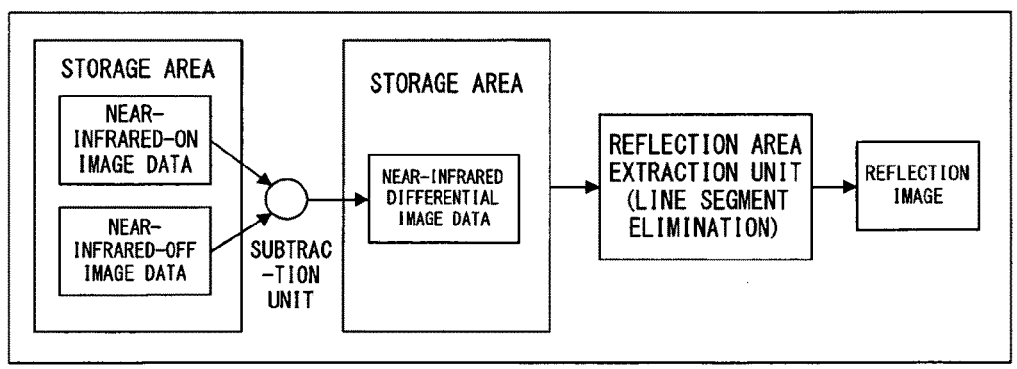
FIG. 11B shows its process.

As shown in FIG. 11B, a difference between an image picked up in a state where near-infrared light and the like, stored in a storage area and an image picked up in a state where the irradiation light 42 is switched off is calculated by a subtraction unit and is stored in the storage area. The reflection area extraction unit applies a line segment elimination process, which is described later, to this image and outputs a reflection image.

Figure 12:
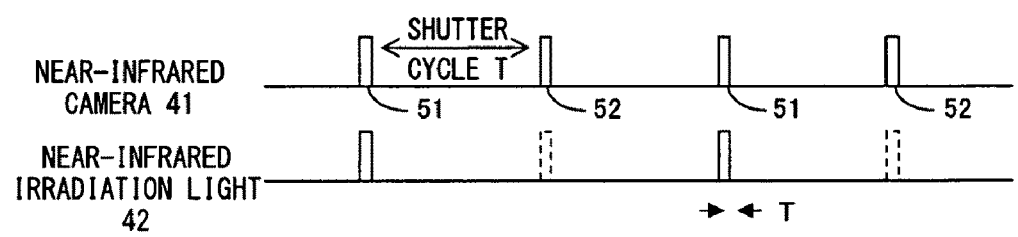
FIG. 12 shows the synchronization between the shutter of a near-infrared camera and near-infrared irradiation light.

The near-infrared camera 41 and the near-infrared irradiation light 42 are synchronized in a shutter cycle T by the synchronous signal of the shutter of the camera 42. As shown in FIG. 12, in an odd field 52 an image is picked up in the on state of the near-infrared irradiation light 42 and in an even field 52, it is picked up in the off state of the near-infrared irradiation light 42. The data of these picked-up images is stored in a storage area, which is not shown in FIG. 12.

The detailed process of the system 40 in the second preferred embodiment is sequentially described below.

[Step 1]

The reflection area extraction unit 43 generates a differential image D from consecutively picked-up images I1 and I2 (light-on image I1 and light-off image I2). In this case, for example, the differential absolute value of a corresponding pixel value can be used.

$$D(x,y)=|I1-I2|$$

[Step 2]

The reflection area extraction unit 43 generates an image B to which a digitization process is applied using a prescribed threshold Th after applying gamma correction to the differential image D by a prescribed coefficient γ. The image B can be calculated as follows.

$$B(x,y)=1 \text{ if } D(x,y)^\gamma>Th \text{ otherwise } 0$$

[Step 3]

The reflection area extraction unit 43 applies an open/close filter for morphological operation in order to eliminate a small isolated point caused in the image B or stop up a hole caused in the image B to generate an image M.

[Step 4]

The reflection area extraction unit 43 applies a smoothing filter of a prescribed window size to the image M to change a pixel area whose symmetry evaluation value is equal to or more than a prescribed threshold Th2 to a reflection area R. For example, the reflection area R can be defined as follows.

[Mathematical expression 5]

$$R(x, y) = \begin{cases} 1 & \text{if } M(x, y) \otimes ones(m, n) > Th2 \\ 0 & \text{otherwise} \end{cases}$$

Figure 13:
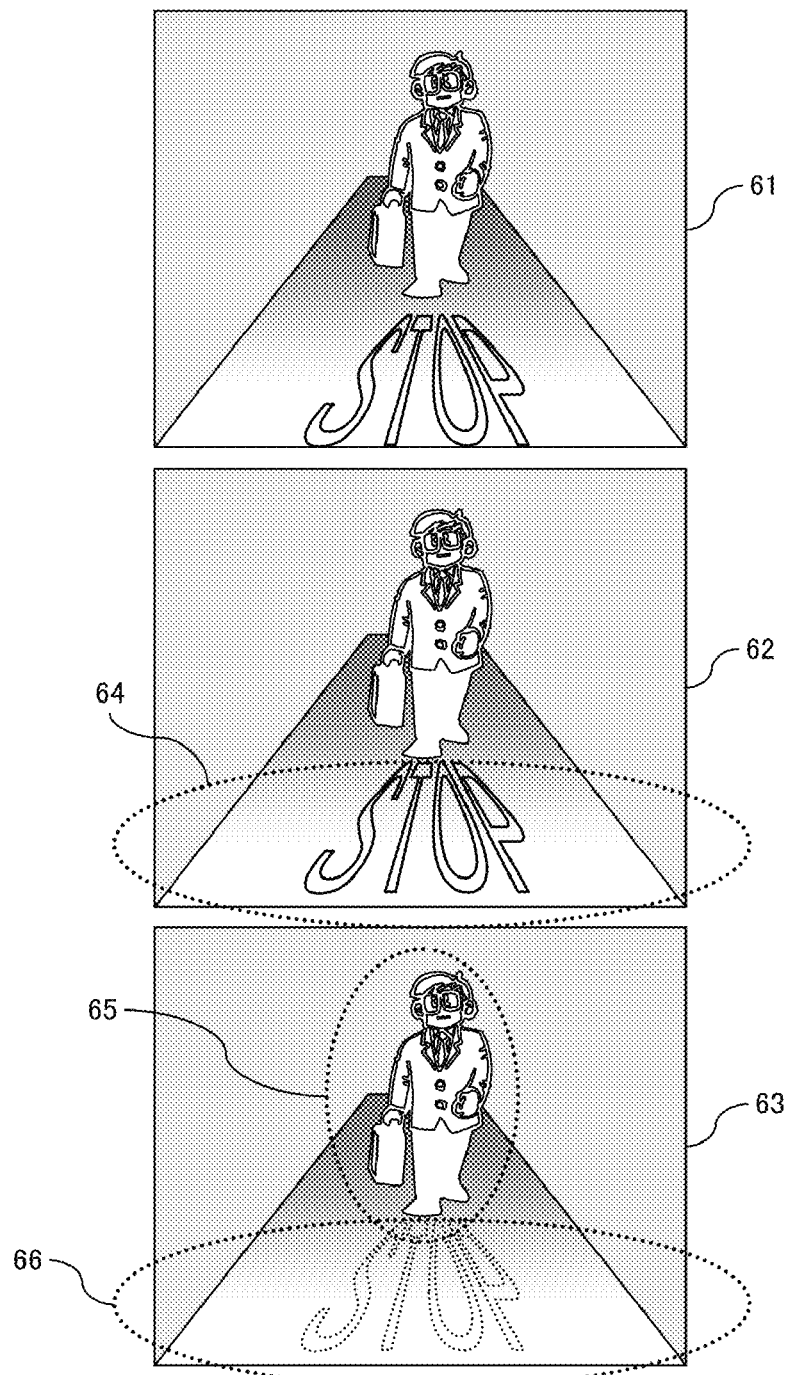
FIG. 13 shows how to calculate a reflection area R in the second preferred embodiment.

Ones(m, n): Matrix m×n in which all elements are 1 Example m=10, n=10
⊗: Convolution operation How to calculate a reflection area R in the second preferred embodiment is shown in FIG. 13.

An image 61 is one picked up while the near-infrared irradiation light 42 is switched off and an image 62 is one picked up while the near-infrared irradiation light 42 is switched on.

The near-infrared irradiation light 42 is hardly applied to a road surface 64 part since it is radiated almost in parallel with the road surface 64.

An image 63 is a differential image between these images 61 and 62 calculated by the subtraction unit.

In the image 63, the irradiation light of the near-infrared irradiation light 42 is applied to a pedestrian 65 to generate a reflection area from it. Although as to the road surface 66, only its edge remains, a smoothing filter applies a line segment elimination process to this to eliminate it.

Thus, only the pedestrian is extracted as a reflection area R.
[Step 6]

The solution unit 45 determines an interval size T on the basis of rectangular area width W corresponding to each y coordinate like the symmetry evaluation unit 25 in the first preferred embodiment. For this interval size T, for example, the minimum odd number exceeding W is determined.

FIG. 14 shows a geometric information table used in the second preferred embodiment.

In FIG. 14, for example, when y=140, the interval size T is the minimum odd number 11 exceeding the rectangle width W=10 of the object.
[Step 7]

The solution unit 45 extracts the lower end point E of the reflection area R extracted from the image in step S5.

The lower end point E can be obtained by evaluating the continuity in the y axis direction of the reflection area R.
[Step 8]

The solution unit 45 assumes that each extracted lower end point E(x, y) is its feet and determines a rectangular area Rect existing in the upper section on the basis of a geometric information table 1.
[Step 9]

The solution unit 45 calculates the symmetry filter reaction value Fi of each pixel in the rectangular area Rect using the interval size Ti of the geometric information table referenced at the y coordinate of each lower end point E(x, y). This process is the same as that in step 2 of the first preferred embodiment.
[Step 10]

The solution unit 45 applies a smoothing process by Vsymm to each rectangular area Rect. This process is the same as that in step 3 of the first preferred embodiment.
[Step 11]

The solution unit 45 applies a thinning process by Thin to each rectangular area Rect. This process is the same as that in step 4 of the first preferred embodiment.
[Step 12]

The solution unit 45 applies a symmetry axis continuity evaluation process to each rectangular area Rect. This process is the same as that in step 5 of the first preferred embodiment.

An identification process by a neutral network and/or a pattern matching process are applied to the candidate pedestrian rectangular area thus obtained as a latter process to determine whether it is a true pedestrian rectangular area.

Thus, a pedestrian rectangular area can be accurately recognized.

Figure 15:
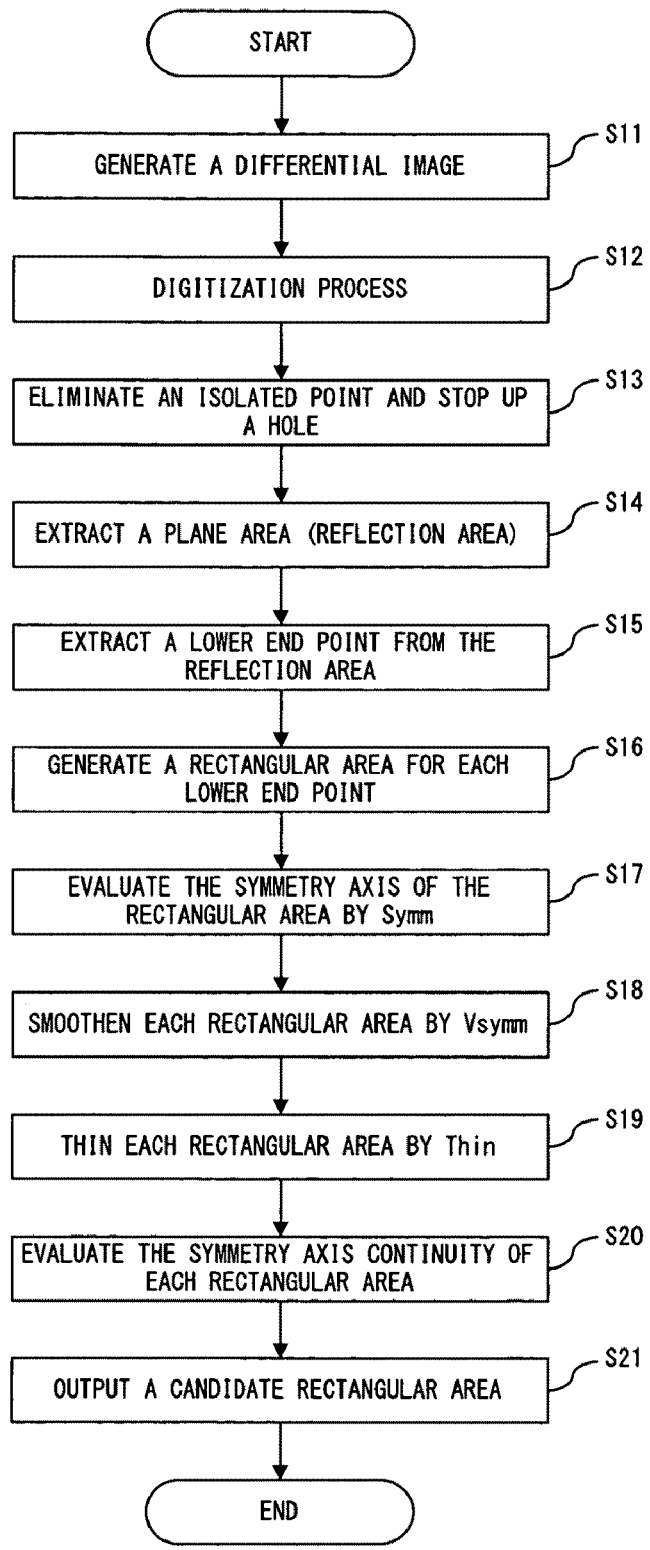
FIG. 15 is a flowchart showing the process of the system in the second preferred embodiment.

FIG. 15 is a flowchart showing a process performed by the system in the second preferred embodiment.

When in FIG. 15, the process is started, firstly, a geometric information table 31 is calculated for each frame as a pretreatment.

Then, in step S11, the reflection area extraction unit 43 performs a differential image generation process. In this differential image generation process, an image picked up when the near-infrared irradiation light 42 is switched on is subtracted from an image picked up when the near-infrared irradiation light 42 is switched off.

Then, in step S12, the reflection area extraction unit 43 digitizes the differential image obtained in step S11. An isolated point is eliminated and a hole is stopped up by applying an open/close filter for morphological operation to this digitized image (step S13).

Then, in step S14, the reflection area extraction unit 43 extracts a reflection area whose symmetry evaluation value is equal to or more than a threshold Th2 as a plane area extraction process. Then, the lower end point M(x, y) of this reflection area is obtained (step S15).

Then, in step S16, the solution unit 44 generates a rectangular area assuming that this lower end point M obtained in step S15 is a pedestrian's feet.

Then, in step S17, the solution unit 44 applies a symmetry axis evaluation process by a function Symm to each rectangular area. This process in step S17 is the same as that in step S3 of the first preferred embodiment.

Then, in step S18, the solution unit 44 applies a smoothing process by Vsymm to each rectangular area. This process in step S18 is the same as that in step S4 of the first preferred embodiment.

Then, in step S19, the solution unit 44 applies a thinning process by Thin to each rectangular area. This process in step S19 is the same as that in step S5 of the first preferred embodiment.

Then, in step S20, the solution unit 44 applies asymmetry axis continuity evaluation process to each rectangular area. This process in step S20 is the same as that in step S7 of the first preferred embodiment.

Then, lastly, in step S21, a candidate rectangular area is outputted.

As described above, according to the system in the second preferred embodiment, even when the lower-body image of a pedestrian is not clear due to the shortage of contrast and even when there is symmetry texture (painting, manhole, etc.) in its feet, the feet can be detected with high accuracy.

Next, the third preferred embodiment of the present invention is described.

Since the system in the third preferred embodiment uses a symmetry interval T aiming a front shoulder width from the upper end until to the lower end of a rectangular area, a symmetry axis candidate is prevented from being extracted on the crosscut painting of a road surface to become the cause of a detection error.

This leads to a problem that it is detected nearer than actual when converting a distance from its own vehicle and a problem that it is discarded in the detail determination of the latter stage processing unit 28 to deteriorate the detection performance.

It also can cope with a problem a candidate area is generated in an area there is no pedestrian by the combination of road surface painting and road background, as in the second preferred embodiment. This also leads to a problem that the number of execution of a detail determination process in the latter stage increases to increase the amount of process.

Figure 16:
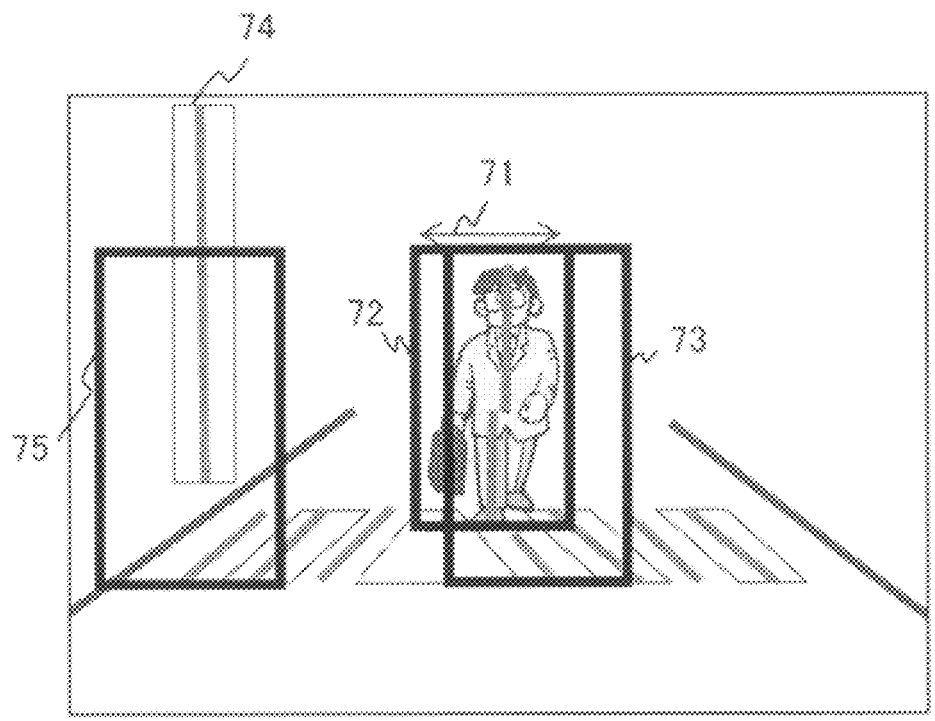
FIG. 16 shows problems to be solved by the system in the third preferred embodiment.

FIG. 16 shows these problems.

In FIG. 16, when detecting an object (pedestrian), for example, a rectangular area including road surface painting or a rectangular area 75 of an object other than a detection target 74 is detected as a candidate area instead of a rectangular area 72 obtained using symmetry interval (interval size) calculated from the shoulder width of the pedestrian in the initial stage.

In the third preferred embodiment, these candidate areas are evaluated and a wrong rectangular area is removed before the detail determination of the latter stage processing unit 28.

The system in this preferred embodiment detects an image area including linear symmetry as an image area having a high possibility of including a pedestrian using an image picked up by a vehicle-mounted single-lens camera taking into consideration a feature that a pedestrian is almost linear-symmetric.

Specifically, in FIG. 3 by evaluating the symmetry of thin rectangular areas 11-1~11-6 supposed to enclose the width of an object, of an image picked up by a camera and evaluating the density and continuity of candidate symmetry axis areas 14-1~14-6 existing in the vicinity of the center axis 13 of a rectangular area 12 supposed to enclose an object, the candidate area of a detection target object is generated, which has a robust effect in a case where a symmetry axis partially deviates or on a symmetry axis in the oblique direction.

In this case, in the third preferred embodiment, for example, if a detection target is a pedestrian, a different symmetry interval is used for each area corresponding to a body part, such as a head, an upper-body, a lower-body and the like of a person when evaluating the symmetry of an area supposed to enclose the width of a person.

Figure 17:
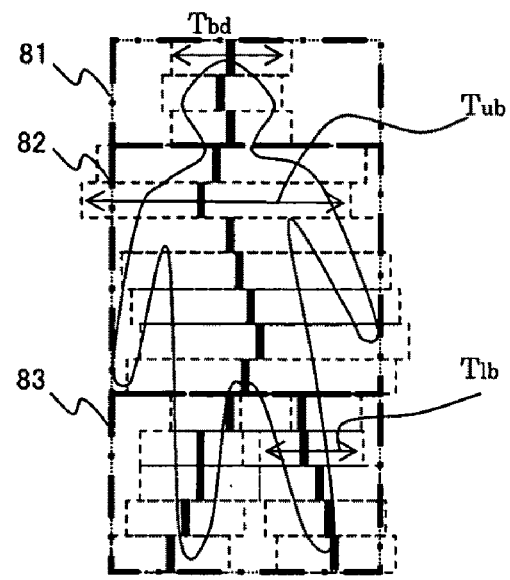
FIG. 17 shows a case where a candidate area is divided into a plurality of areas and a different symmetry interval is used for each area.

FIG. 17 shows a case where a candidate area is divided into a plurality of areas and a different symmetry interval is used for each area.

FIG. 17 shows the candidate area of a pedestrian. The candidate symmetry axis areas of a head area 81, an upper-body area 82 and a lower-body area 83 are calculated using different symmetry intervals Tbd, Tub and Tlb, respectively.

Thus, the system in the third preferred embodiment can realize higher detection capability than the system in the first preferred embodiment.

Figure 18:
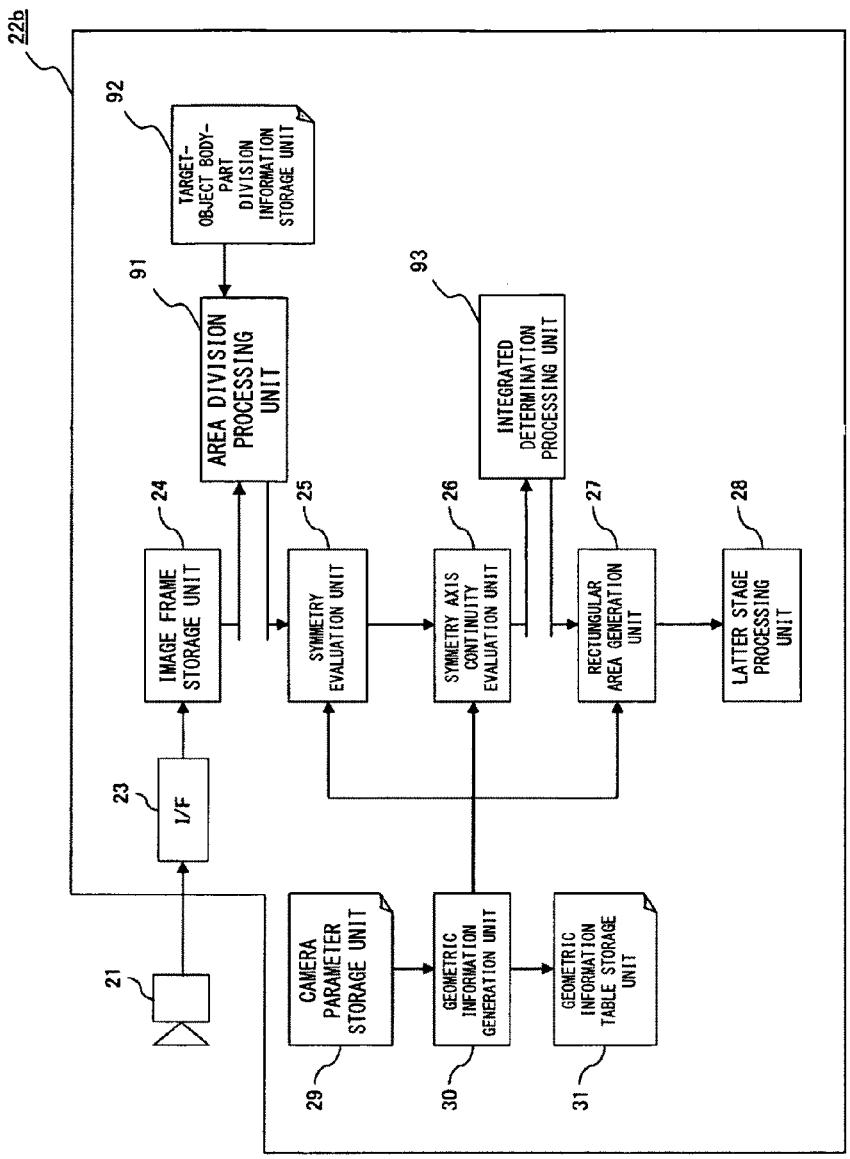
FIG. 18 shows a system composition example of the third preferred embodiment.

FIG. 18 shows a system composition example of the third preferred embodiment.

FIG. 18 is drawn in comparison with the system composition example of the first preferred embodiment shown in FIG. 4 and the same reference numerals are attached components having the substantially same function as the first preferred embodiment.

When compared with the configuration shown in FIG. 4, the configuration shown in FIG. 18 further comprises an area division processing unit 91, a target body-part division information storage unit 92 and an integrated determination processing unit 93.

The area division processing unit 91 divides a whole-body rectangular area into a plurality of body-part areas on the basis of information stored in the target body-part division information storage unit 92. The target body-part division information storage unit 92 stores body-part area information depending on a target object (pedestrian) of a rectangular area enclosing the whole body of a person, determined on the basis of a geometric information table. The integrated determination processing unit 93 integratedly determines whether the whole-body rectangular area includes a target object (pedestrian), on the basis of the existence possibility of a symmetry axis, obtained from the plurality of body-part areas.

Then, the symmetry axis continuity evaluation unit 26 calculates the existence probability of a symmetry axis in one of the body-part areas divided by the area division processing unit 91.

The detailed process of the system 22b in the third preferred embodiment is sequentially described below.

The following processes in step A are applied to each Y coordinate.
[step A-1]
The area division processing unit 91 determines the vertical side length of the whole-body rectangular area enclosing a person at each Y coordinate, on the basis of a geometric information table being currently processed. An interval size to be applied to each area is determined by referring to the body-part area information stored in the target body-part division information storage unit 92 by this vertical side length.

For example, when the area division processing unit 91 divides the whole-body rectangular area into three areas of a head, an upper-body and a lower-body, the body-part area information stored in the target body-part division information storage unit 92 includes a vertical division ratio, a ratio of an interval size in each area, and the rectangle width W of an object, as shown in FIG. 19. It also includes a position in the horizontal direction where asymmetry axis exists, of the body-part area.

For example, the vertical division ratio (Y coordinate) of the head, the upper body and the lower body is calculated to be 1:2:2 according to a vertical division ratio. The ratios of the interval sizes of the head and the upper body and the lower body to the rectangle width W of an object are expressed 0.5, 1 and 0.3, respectively. Furthermore, when expressing the expected value of the existing position of a symmetry axis, those of the head and the upper body become 0.5. That of the lower body becomes 0.3 and 0.7 since there is a high possibility that two symmetry axes may appear.

Figure 20:
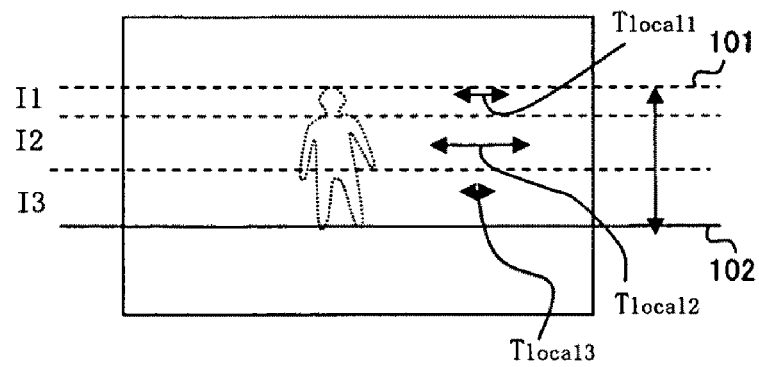
FIG. 20 typically shows a partial image area Ii.

Then, as shown in FIG. 20 an area between the line 101 of Y=130 and the line 102 of Y=180 (area of Y=131~180) is divided into three areas I1, I2 and I3 at the ratio of 1:2:2 from the top using this piece of body-part area information, for example, H=50 and W=25 in the case where its Y coordinate is 180, shown in FIG. 5. Then, interval sizes Tlocal1 (corresponding to Tbd shown in FIG. 17), Tlocal2 (corresponding to Tub shown in FIG. 17) and Tlocal3 (corresponding to Tlb shown in FIG. 17) of the areas I1, I2 and I3, which are used by the symmetry evaluation unit 25 are calculated as follows.

$$Tlocal1 = W*0.5 \approx 13$$

$$Tlocal2 = W*1 \approx 25$$

$$Tlocal3 = W*0.3 \approx 8$$

Then, the following processes are applied to each partial image area Ii.

The following processes in step B shows ones applied to each partial image area Ii.
[Step B-1]
The symmetry evaluation unit 25 generates a filter reactive image Fi by evaluating the symmetry in the horizontal direction at each pixel x of the image area Ii by the function Symm(x, T) of asymmetry filter using each interval size Tlocal_i (the same process in Step 2 of the first preferred embodiment).
[Step B-2]
The symmetry axis continuity evaluation unit 26 applies a smoothing process to each image Fi using a weight in the vertical direction to generate an image Fi'. This can be obtained, for example, by an evaluation expression Vsymm (x) (the same process in Step 3 of the first preferred embodiment).
[Step B-3]
The symmetry axis continuity evaluation unit 26 applies a thinning process to the image Fi' after the smoothing process only in the vertical direction of an area Fx whose symmetry evaluation value is equal to or more than a specific threshold Th_i and extracts a line segment area EL obtained by the thinning process (the same process in Step 4 of the first preferred embodiment).

Then, the following processes are applied to each X coordinate.

The following processes in step C are applied to each X coordinate.

[Step C-1]

The symmetry axis continuity evaluation unit 26 determines a rectangular area R existing above the present process target pixel (x, y) on the basis of the geometric information table 31 (corresponding to Step 6 in the first preferred embodiment).

Specifically, the area of X=−W/2+x~x+W/2, Y=y−H+1~y in an area between the line 101 of Y=130 and the line 102 of Y=180 is determined to be a rectangular area R on the basis of the rectangle width W of the object, obtained from the Y coordinate.

Then, the following processes are applied to each partial rectangular area Ri.

The following process in step D is applied to each partial rectangular area Ri.

Figure 21:
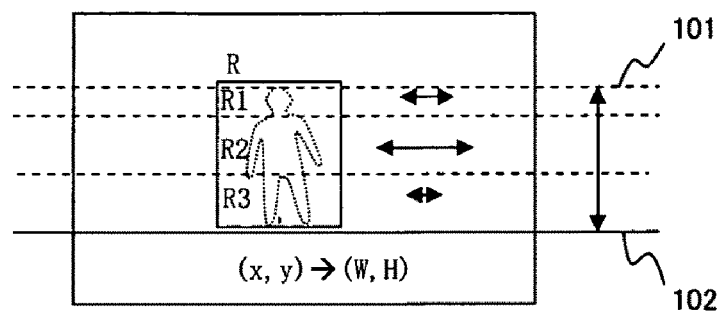
FIG. 21 typically shows a partial area Ri.

FIG. 21 typically shows the partial image area Ri in an area between a line 101 of Y=130 and a line of Y=180.

[Step D-1]

The symmetry axis continuity evaluation unit 26 evaluates the density of a thinning line segment area EL, in the vicinity of the Ri defined by the rectangular area R determined in step C-1 and the image area Ii and calculates the existence probability of a symmetry axis Psymm_i.

For example, the center position x1 of the area Ri is determined referring to the body-part area information and on the basis of the existing position (expected value) of asymmetry axis. For example, in the case of a head, it is obtained according to x1=0.5*W.

In this case, if the y coordinate of the area Ri is y1~y2, the existence NEL of a thinning line segment area EL in each line of the area a % using x1 as the center (x=x1−0.5*a*W~x1+0.5*a*W, y=y1−H~y1) is evaluated.

When assuming the total of the NEL of all lines in the center area of a % to be SNEL, it can be defined that Psymm_i=NEL/(y2−y1+1) (the same as [Step 7] in the first preferred embodiment).

When two or more symmetry axes can be expected in the area Ri, as in the case of a lower body, the Psymm of each position, which can be obtained by referring to the body-part area information, is calculated.

When the process in step D is completed, step C-2 is applied to each X coordinate.

[Step C-2]

It is integratedly determined whether the rectangular area R includes a target object, on the basis of the Psymm from each partial rectangular area Ri. For example, if all Psymm_i satisfies a prescribed threshold Thi, it is determined that there is a symmetry axis corresponding to each body part of a pedestrian to adopt the area R. Otherwise, it is discarded (when two or more existence probabilities are obtained from Ri, an "or" condition is attached).

if Psymm1>Th1 & Psymm2>Th2 & (Psymm31>Th31 □ Psymm32>Th32) then f (Psymm1, Psymm2, Psymm3)=1 otherwise 0

Then, if f(Psymm1, Psymm2, Psymm3) is 1 according to the evaluation function, all the partial areas are adopted. If it is 0, all the partial areas are discarded.

By applying the above-described steps to all Y coordinates, it is determined whether there is a pedestrian in each point (x, y).

Figure 22:
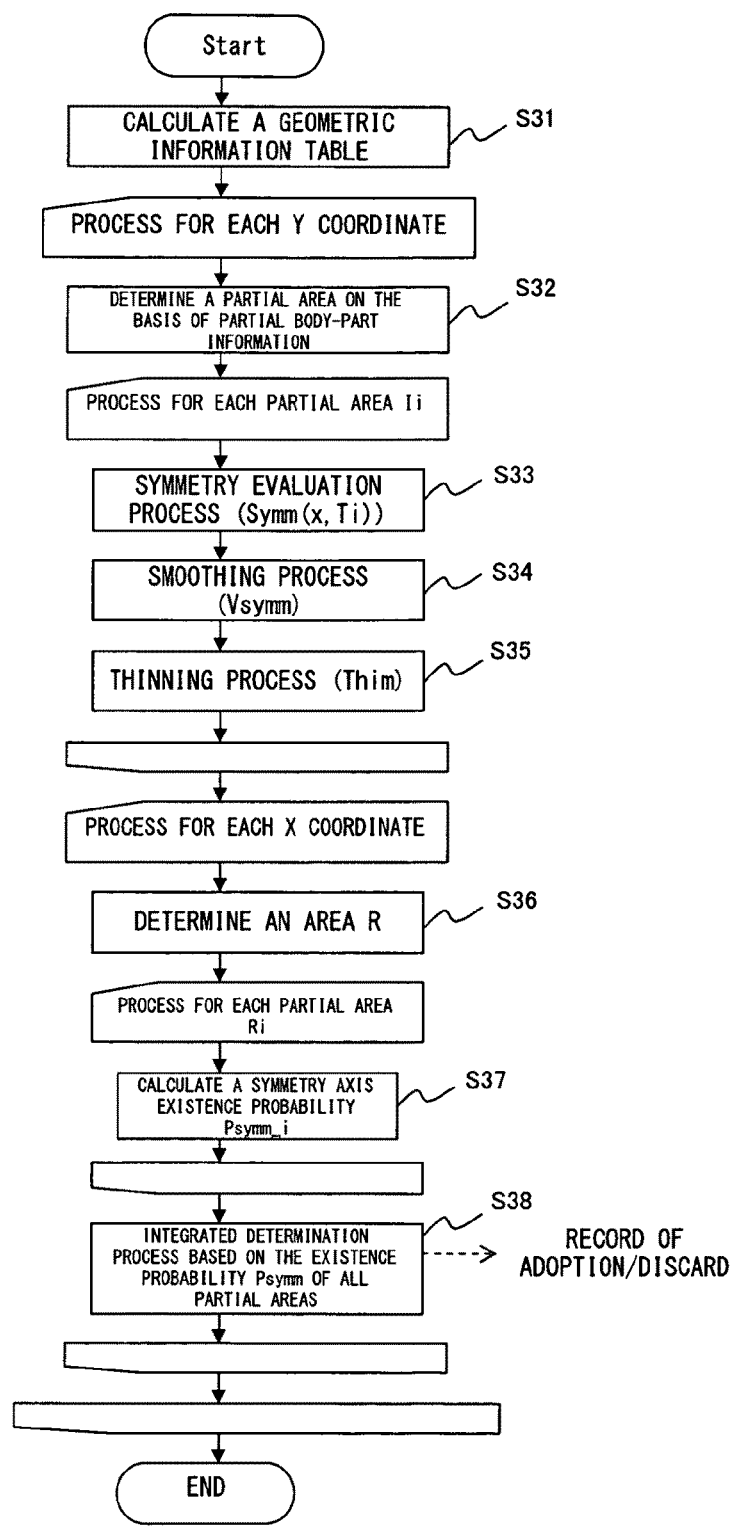
FIG. 22 is a flowchart showing the process of the system in the third preferred embodiment.

FIG. 22 is a flowchart showing the process of the system in the third preferred embodiment.

When the process shown in FIG. 22 is started, firstly, in step S31, a geometric information table is calculated for each frame.

This geometric information table is calculated from parameters, such as the height, inclination, focus distance and the like of a camera.

Then, the following processes in step S32~S38 are repeatedly applied to each Y coordinate.

Firstly, in step S32, a partial area is determined on the basis of the body-part area information.

For example, when the body-part area information is as shown in FIG. 19, the whole-body area is divided into the partial areas of a head, an upper-body and a lower-body at the ratio of 1:2:2, respectively. The interval size of each partial area is determined.

Then, the following processes in step S33 S35 are applied to each partial area Ii.

Firstly, in step S33, the symmetry evaluation unit 25 generates a filter reactive image Fi which is evaluated by the function Symm(x, T) of a symmetry filter.

Then, in step S34, the symmetry axis continuity evaluation unit 26 applies a smoothing process to each image Fi using a weight in the vertical direction to generates an image Fi'.

Then, in step S35, the symmetry axis continuity evaluation unit 26 applies to a thinning process to only the vertical direction of an area whose symmetry evaluation is equal to or more than a specific threshold Th_i of the image Fi' after the smoothing process and extracts an line segment area EL obtained by the thinning process.

After applying the above-described processes in steps S33~S35 to all the partial areas Ii, step S36 is applied to each X coordinate.

In step S36, a partial area R is determined.

Then, the process in step S37 is applied to all the partial areas Ri.

In step S37, the symmetry axis existence probability of each partial area Ri is calculated.

Then, after the process in step S37, in step S38 a determination process based on a existence probability of all the partial areas Psymm is performed using f(Psymm1, Psymm2, □□□). After applying the processes in step S32 through S38 to all the Y coordinates, this process terminated.

As described above, according to the system of the first preferred embodiment, a candidate pedestrian area is generated by evaluating the symmetry of a thin rectangular area supposed to enclose the width of a pedestrian and evaluating the density and continuity of a candidate symmetry axis area existing in the vicinity of the center axis of the rectangular area, which has a robust effect on a case where the symmetry axis partially deviates and a symmetry axis in the oblique direction.

Thus, the problems that a rectangular area is recognized smaller than essential, that a distance is recognized to be extremely farther than essential, that a rectangular area is discarded by the detail determination in the latter stage and that a detection function deteriorates can be solved.

Since a single-lens camera is used, an inexpensive and small-scaled system can be realized.

According to the system of the second preferred embodiment, even when contrast with a background is insufficient and the image of a lower body is not clear and even when there is a symmetry texture (painting, manhole, etc.) in its feet, the feet can be detected with accuracy. As in the system in the first preferred embodiment, the problems that a distance is recognized to be extremely farther than essential, that a rectangular area is discarded by the detail determination in the latter stage and that a detection function deteriorates can be solved.

According to the system of the third preferred embodiment, by dividing a rectangular area into a plurality of partial areas and evaluating the symmetry axis of each partial area using a different interval size, the number of detection errors decrease, thereby realizing a far higher object detection function.

Although in the above-described examples, a pedestrian is used as one example of the detection target to be detected by the object detection system, the detection target of detection target according to the present invention is not limited to a pedestrian and it can be any other object having slight symmetry, such as a signboard, a sign, an automobile, a bicycle, a motorcycle and the like.

What is claimed is:

1. An object detection system, comprising:
   a geometric information generation unit for calculating relationship information between a position on an image of an object existing on a road surface and an image area size of an image picked up by one camera, using an actual size of a target object and camera parameter information;
   a symmetry evaluation unit for evaluating an existence possibility of a symmetry axis in a specific pixel in case of an interval size determined on the basis of geometric information;
   a symmetry-axis continuity evaluation unit for evaluating density and continuity in the vicinity of the center axis of a rectangular area of a pixel whose symmetry value evaluated by the symmetry evaluation unit is equal to or more than a specific threshold and detecting the lowest end point of the symmetric object; and
   a rectangular area generation unit for outputting a position and size of a candidate area of the symmetric object on the basis of the lowest end point specified by the symmetry-axis continuity evaluation unit and the geometric information.

2. The object detection system according to claim 1, further comprising
   a geometric information table storage unit for storing a table which corresponds between a position in the vertical direction of a pixel in the picked-up image and a width and a vertical size of the rectangular area to enclose the target object are related to each other as the geometric information.

3. The object detection system according to claim 1, wherein
   when a position in the horizontal direction of a pixel and the interval size are x and T, respectively, the symmetry evaluation unit evaluates the existence possibility of a symmetry axis using the following function Symm(x, T)

$$Symm(x, T) = \frac{\sum_{u=1}^{T} E'(u, x)^2 - \sum_{u=1}^{T} O(u, x)^2}{\sum_{u=1}^{T} E'(u, x)^2 + \sum_{u=1}^{T} O(u, x)^2}$$

Even function component $E(u,x)=0.5*(I(x-u)+I(x+u))$ □Normalized $E'=E-E_{AV}$
odd function component $O(u,x)=0.5*(I(x-u)+I(x+u))$
$E_{AV}$ is the average of E in $u=1\sim T$.

4. The object detection system according to claim 1, wherein
   when a position in the horizontal direction of a pixel and the interval size are x and T, respectively, the symmetry evaluation unit evaluates the existence possibility of a symmetry axis using the following function Symm(x, T)

$$Symm(x, T) = \frac{\sum_{y}\sum_{u=1}^{T} E'(u, x, y)^2 - \sum_{y}\sum_{u=1}^{T} O(u, x, y)^2}{\sum_{y}\sum_{u=1}^{T} E'(u, x, y)^2 + \sum_{y}\sum_{u=1}^{T} O(u, x, y)^2}$$

Even function component $E(u,x,y)=0.5*(I(x-u,y)+I(x+u,y))$ □Normalized $E'=E-E_{AV}$
Odd function component $O(u,x,y)=0.5*(I(x-u,y)+I(x+u,y))$
$E_{AV}$ is the average of E in $u=1\sim T$.

5. The object detection system according to claim 1, wherein
   a smoothing process is applied to a pixel whose symmetry value evaluated by the symmetry evaluation unit is equal to or more than a specific threshold, a thinning process is applied to an image composed of pixels after the smoothing process and the lowest end point of a line segment area obtained by the thinning process is calculated.

6. The object detection system according to claim 1, wherein
   the rectangular area generation unit integrates closely located ones, of the lowest end points detects by the symmetry axis continuity evaluation unit and outputs a rectangular area a lowest end point of which is the lowest end point as a position and size of a candidate area of the target object.

7. The object detection system according to claim 1, further comprising
   a reflection area extraction unit connected to an irradiation light for alternately switching on/off in synchronization with a shutter of the camera, for calculating a differential image between an image picked up when the irradiation light is switched on and an image picked up when the irradiation light is switched off and extracting a reflection area by applying a line segment elimination filter to the differential image,
wherein
   the geometric information generation unit calculates relationship information between a position on an image of an object existing on a road surface and an image area size in the reflection area, using an actual size of a target object and camera parameter information.

8. The object detection system according to claim 7, wherein
   the irradiation light is a near-infrared irradiation light.

9. The object detection system according to claim 7, wherein
   the irradiation light radiates light in almost parallel with a road surface.

10. The object detection system according to claim 1, wherein
    the target object is a pedestrian.

11. The object detection system according to claim 1, further comprising:
    a target-object body-part division information storage unit for storing body-part area information depending on the target object in the rectangular area;
    an area division processing unit for dividing a rectangular area into a plurality of partial areas on the basis of the body-part area information; and an integrated determination unit for integratedly determining a candidate pedestrian area on the basis of a symmetry axis existence probability calculated by the symmetry-axis continuity evaluation unit in each of the partial areas, wherein the symmetry evaluation unit evaluates the existence possibility of a symmetry axis in each of the divided partial areas using the interval size defined by the body-part area information and the symmetry-axis continuity evaluation unit evaluates density in a prescribed position of a partial area of a candidate symmetry axis area evaluated by the symmetry evaluation unit and calculates a symmetry axis existing probability.

12. The object detection system according to claim 11, wherein the target object is a pedestrian and the area division processing unit divides the rectangular area into a partial area corresponding to a head of the pedestrian, a partial area corresponding to an upper-body and a partial area corresponding to a lower-body.

13. An object detection method, comprising:

calculating relationship information between a position on an image of an object existing on a road surface and an image area size of an image picked up by one camera, using an actual size of a target object and camera parameter information;

evaluating an existence possibility of a symmetry axis in a specific pixel, in case of an interval T determined on the basis of geometric information;

evaluating density and continuity in the vicinity of the center axis of a rectangular area of a pixel whose evaluated symmetry value is equal to or more than a specific and detecting the lowest end point of the symmetric object; and outputting a position and size of a candidate area of the symmetric object on the basis of the lowest end point specified by the symmetry-axis continuity evaluation unit and the geometric information.

14. The object detection method according to claim 13, further comprising:

dividing a rectangular area into a plurality of partial areas on the basis of the stored body-part area information depending on the target project in the rectangular area;

integratedly determining a candidate pedestrian area on the basis of a symmetry axis existence probability calculated in each of the partial areas;

evaluating existence possibility of a symmetry axis in each of the divided partial areas, using the interval size defined by the body-part area information; and evaluating density in a prescribed position of a partial area of the candidate symmetry axis area evaluated by the symmetry evaluation unit and calculating a symmetry axis existing probability.

15. The object detection method according to claim 13, wherein a differential image between an image picked up when the irradiation light is switched on and an image picked up when the irradiation light is switched off is calculated, a reflection area is extracted applying a line segment elimination filter to the differential image and relationship information between a position on an image of an object existing on a road surface and an image area size in the reflection area is calculated, using an actual size of a target object and camera parameter information.

* * * * *

UNITED STATES PATENT AND TRADEMARK OFFICE
CERTIFICATE OF CORRECTION

PATENT NO.        : 8,045,759 B2
APPLICATION NO.   : 12/230116
DATED             : October 25, 2011
INVENTOR(S)       : Masami Mizutani et al.

Page 1 of 4

It is certified that error appears in the above-identified patent and that said Letters Patent is hereby corrected as shown below:

On the title page

Column 1, under "Nov. 29, 2006   (WO) .................. PCT/JP2006/323792" insert -- Jun. 8, 2007   (WO) .................. PCT/JP2007000616 --.

In the Claims

Column 17, lines 17-37, please delete claim 1 in its entirety and replace with the following --1. An object detection system, comprising:
at least one processor programmed to provide
a geometric information generation unit for calculating geometric information between a position on an image of an object existing on a road surface and an image area size of an image picked up by one camera, using an actual size of a target object and camera parameter information;
a symmetry evaluation unit for evaluating an existence possibility of a symmetry axis in a specific pixel in case of an interval size determined on the basis of geometric information;
a symmetry-axis continuity evaluation unit for
evaluating continuity of a pixel whose value obtained from evaluation by the symmetry evaluation unit is equal to or more than a specific threshold,
detecting the lowest end point, and
evaluating density of a pixel forming a symmetry axis in the vicinity of the center axis of a rectangular area that is obtained based on the lowest end point detected and the geometric information; and
a rectangular area generation unit for outputting a position and size of the rectangular area as a candidate area of the target object when a value obtained from evaluation of the density evaluated by the symmetry-axis continuity evaluation unit is equal to or more than a specific value.--

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,045,759 B2

Column 17, lines 46-63, please delete claim 3 in its entirety and replace with the following --3. The object detection system according to claim 1, wherein when a position in the horizontal direction of a pixel and the interval size are x and T, respectively, the symmetry evaluation unit evaluates the existence possibility of a symmetry axis using the following function Symm(x, T).

$$Symm(x,T) = \frac{\sum_{u=1}^{T} E'(u,x)^2 - \sum_{u=1}^{T} O(u,x)^2}{\sum_{u=1}^{T} E'(u,x)^2 + \sum_{u=1}^{T} O(u,x)^2}$$

Even function component E(u,x) = 0.5*(I(x-u) + I(x+u)) ⇒Normalized E'= E - $E_{AV}$ Odd function component O(u,x) = 0.5*(I(x-u) + I(x+u))

$E_{AV}$ is the average of E in u=1 to T--

Column 17, line 64 - Column 18, line 15, please delete claim 4 in its entirety and replace with the following --4. The object detection system according to claim 1, wherein when a position in the horizontal direction of a pixel and the interval size are x and T, respectively, the symmetry evaluation unit evaluates the existence possibility of a symmetry axis using the following function Symm(x, T).

$$Symm(x,T) = \frac{\sum_{y}\sum_{u=1}^{T} E'(u,x,y)^2 - \sum_{y}\sum_{u=1}^{T} O(u,x,y)^2}{\sum_{y}\sum_{u=1}^{T} E'(u,x,y)^2 + \sum_{y}\sum_{u=1}^{T} O(u,x,y)^2}$$

Even function component E(u,x,y) = 0.5*(I(x-u,y) + I(x+u,y)) ⇒Normalized E'= E - $E_{AV}$ Odd function component O(u,x, y) = 0.5*(I(x-u,y) + I(x+u, y))

$E_{AV}$ is the average of E in u=1 to T--

Column 18, lines 16-24, please delete claim 5 in its entirety and replace with the following --5. The object detection system according to claim 1, wherein for each pixel, a smoothing process is applied to an evaluation value for possibility of the symmetry axis obtained from evaluation by the symmetry evaluation unit, a thinning process is applied to an image composed of pixels whose evaluation value to which the smoothing process has been applied is equal to or more than a specific threshold, and the lowest end point of a line segment area obtained by the thinning process is calculated.--

CERTIFICATE OF CORRECTION (continued)
U.S. Pat. No. 8,045,759 B2

Column 18, lines 34-49, please delete claim 7 in its entirety and replace with the following --7. The object detection system according to claim 1,
further comprising a reflection area extraction unit connected to an irradiation light for alternately switching on/off in synchronization with a shutter of the camera, for calculating a differential image between an image picked up when the irradiation light is switched on and an image picked up when the irradiation light is switched off and extracting a reflection area by applying a line segment elimination filter to the differential image,
wherein the geometric information generation unit calculates geometric information between a position on an image of an object existing on a road surface and an image area size in the reflection area, using an actual size of a target object and camera parameter information.--

Column 19, line 24 - Column 20, line 7, please delete claim 13 in its entirety and replace with the following --13. An object detection method, comprising:
calculating geometric information between a position on an image of an object existing on a road surface and an image area size of an image picked up by one camera, using an actual size of a target object and camera parameter information;
evaluating an existence possibility of a symmetry axis in a specific pixel, in case of an interval size determined on the basis of geometric information;
evaluating continuity of a pixel whose value obtained from evaluation of the existence possibility is equal to or more than a specific threshold;
detecting the lowest end point;
evaluating density of a pixel forming a symmetry axis in the vicinity of the center axis of a rectangular area that is obtained based on the lowest end point detected and the geometric information; and
outputting a position and size of the rectangular area as a candidate area of the target object when a value obtained from evaluation of the density is equal to or more than a specific value.--

Column 20, lines 8-21, please delete claim 14 in its entirety and replace with the following --14. The object detection method according to claim 13, further comprising:
dividing a rectangular area into a plurality of partial areas on the basis of the stored body-part area information depending on the target project in the rectangular area;
integratedly determining a candidate pedestrian area on the basis of a symmetry axis existence probability calculated in each of the partial areas;
evaluating existence possibility of a symmetry axis in each of the divided partial areas, using the interval size defined by the body-part area information;
evaluating density in a prescribed position of a partial area of a candidate symmetry axis area for which the existence possibility of the symmetry axis has been evaluated; and
calculating a symmetry axis existing probability.--

CERTIFICATE OF CORRECTION (continued)
U.S. Pat. No. 8,045,759 B2

Column 20, lines 22-32, please delete claim 15 in its entirety and replace with the following --15. The object detection method according to claim 13, wherein a differential image between an image picked up when the irradiation light is switched on and an image picked up when the irradiation light is switched off is calculated, a reflection area is extracted applying a line segment elimination filter to the differential image and geometric information between a position on an image of an object existing on a road surface and an image area size in the reflection area is calculated, using an actual size of a target object and camera parameter information.--

UNITED STATES PATENT AND TRADEMARK OFFICE
CERTIFICATE OF CORRECTION

| | | |
|---|---|---|
| PATENT NO. | : 8,045,759 B2 | Page 1 of 4 |
| APPLICATION NO. | : 12/230116 | |
| DATED | : October 25, 2011 | |
| INVENTOR(S) | : Masami Mizutani et al. | |

It is certified that error appears in the above-identified patent and that said Letters Patent is hereby corrected as shown below:

On the title page

Column 1, under "Nov. 29, 2006 (WO) .................. PCT/JP2006/323792" insert -- Jun. 8, 2007 (WO) .................. PCT/JP2007000616 --.

In the Claims

Column 17, lines 17-37, please delete claim 1 in its entirety and replace with the following --1. An object detection system, comprising:
at least one processor programmed to provide
a geometric information generation unit for calculating geometric information between a position on an image of an object existing on a road surface and an image area size of an image picked up by one camera, using an actual size of a target object and camera parameter information;
a symmetry evaluation unit for evaluating an existence possibility of a symmetry axis in a specific pixel in case of an interval size determined on the basis of geometric information;
a symmetry-axis continuity evaluation unit for
evaluating continuity of a pixel whose value obtained from evaluation by the symmetry evaluation unit is equal to or more than a specific threshold,
detecting the lowest end point, and
evaluating density of a pixel forming a symmetry axis in the vicinity of the center axis of a rectangular area that is obtained based on the lowest end point detected and the geometric information; and
a rectangular area generation unit for outputting a position and size of the rectangular area as a candidate area of the target object when a value obtained from evaluation of the density evaluated by the symmetry-axis continuity evaluation unit is equal to or more than a specific value.--

This certificate supersedes the Certificate of Correction issued October 15, 2013.

Signed and Sealed this
Nineteenth Day of November, 2013

Teresa Stanek Rea
*Deputy Director of the United States Patent and Trademark Office*

CERTIFICATE OF CORRECTION (continued)

Column 17, lines 46-63, please delete claim 3 in its entirety and replace with the following --3. The object detection system according to claim 1, wherein when a position in the horizontal direction of a pixel and the interval size are x and T, respectively, the symmetry evaluation unit evaluates the existence possibility of a symmetry axis using the following function Symm(x, T)

$$Symm(x,T) = \frac{\sum_{u=1}^{T} E'(u,x)^2 - \sum_{u=1}^{T} O(u,x)^2}{\sum_{u=1}^{T} E'(u,x)^2 + \sum_{u=1}^{T} O(u,x)^2}$$

Even function component E(u,x) = 0.5*(I(x-u) + I(x+u)) ⇒Normalized E'= E - $E_{AV}$ Odd function component O(u,x) = 0.5*(I(x-u) + I(x+u))

$E_{AV}$ is the average of E in u=1 to T.--

Column 17, line 64 - Column 18, line 15, please delete claim 4 in its entirety and replace with the following --4. The object detection system according to claim 1, wherein
when a position in the horizontal direction of a pixel and the interval size are x and T, respectively, the symmetry evaluation unit evaluates the existence possibility of a symmetry axis using the following function Symm(x, T)

$$Symm(x,T) = \frac{\sum_{y}\sum_{u=1}^{T} E'(u,x,y)^2 - \sum_{y}\sum_{u=1}^{T} O(u,x,y)^2}{\sum_{y}\sum_{u=1}^{T} E'(u,x,y)^2 + \sum_{y}\sum_{u=1}^{T} O(u,x,y)^2}$$

Even function component E(u,x,y) = 0.5*(I(x-u,y) + I(x+u,y)) ⇒Normalized E'= E - $E_{AV}$ Odd function component O(u,x, y) = 0.5*(I(x-u,y) + I(x+u, y))

$E_{AV}$ is the average of E in u=1 to T.--

Column 18, lines 16-24, please delete claim 5 in its entirety and replace with the following --5. The object detection system according to claim 1, wherein
for each pixel, a smoothing process is applied to an evaluation value for possibility of the symmetry axis obtained from evaluation by the symmetry evaluation unit,
a thinning process is applied to an image composed of pixels whose evaluation value to which the smoothing process has been applied is equal to or more than a specific threshold, and
the lowest end point of a line segment area obtained by the thinning process is calculated.--

CERTIFICATE OF CORRECTION (continued)
U.S. Pat. No. 8,045,759 B2

Column 18, lines 34-49, please delete claim 7 in its entirety and replace with the following --7. The object detection system according to claim 1,
further comprising a reflection area extraction unit connected to an irradiation light for alternately switching on/off in synchronization with a shutter of the camera, for calculating a differential image between an image picked up when the irradiation light is switched on and an image picked up when the irradiation light is switched off and extracting a reflection area by applying a line segment elimination filter to the differential image,
wherein the geometric information generation unit calculates geometric information between a position on an image of an object existing on a road surface and an image area size in the reflection area, using an actual size of a target object and camera parameter information.--

Column 19, line 24 - Column 20, line 7, please delete claim 13 in its entirety and replace with the following --13. An object detection method, comprising:
calculating geometric information between a position on an image of an object existing on a road surface and an image area size of an image picked up by one camera, using an actual size of a target object and camera parameter information;
evaluating an existence possibility of a symmetry axis in a specific pixel, in case of an interval size determined on the basis of geometric information;
evaluating continuity of a pixel whose value obtained from evaluation of the existence possibility is equal to or more than a specific threshold;
detecting the lowest end point;
evaluating density of a pixel forming a symmetry axis in the vicinity of the center axis of a rectangular area that is obtained based on the lowest end point detected and the geometric information; and
outputting a position and size of the rectangular area as a candidate area of the target object when a value obtained from evaluation of the density is equal to or more than a specific value.--

Column 20, lines 8-21, please delete claim 14 in its entirety and replace with the following --14. The object detection method according to claim 13, further comprising:
dividing a rectangular area into a plurality of partial areas on the basis of the stored body-part area information depending on the target project in the rectangular area;
integratedly determining a candidate pedestrian area on the basis of a symmetry axis existence probability calculated in each of the partial areas;
evaluating existence possibility of a symmetry axis in each of the divided partial areas, using the interval size defined by the body-part area information;
evaluating density in a prescribed position of a partial area of a candidate symmetry axis area for which the existence possibility of the symmetry axis has been evaluated; and
calculating a symmetry axis existing probability.--

CERTIFICATE OF CORRECTION (continued)
U.S. Pat. No. 8,045,759 B2

Column 20, lines 22-32, please delete claim 15 in its entirety and replace with the following --15. The object detection method according to claim 13, wherein a differential image between an image picked up when the irradiation light is switched on and an image picked up when the irradiation light is switched off is calculated, a reflection area is extracted applying a line segment elimination filter to the differential image and geometric information between a position on an image of an object existing on a road surface and an image area size in the reflection area is calculated, using an actual size of a target object and camera parameter information.--